(12) United States Patent
Saravanan et al.

(10) Patent No.: US 12,413,662 B2
(45) Date of Patent: Sep. 9, 2025

(54) MOBILE DEVICE AND METHOD FOR PROVIDING PERSONALIZED MANAGEMENT SYSTEM

(71) Applicant: SAMSUNG ELECTRONICS CO., LTD., Suwon-si (KR)

(72) Inventors: Karthikeyan Palavedu Saravanan, Chertsey (GB); Ramesh Munikrishnappa, Chertsey (GB); Daniel Ansorregui Lobete, Chertsey (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 18/070,897

(22) Filed: Nov. 29, 2022

(65) Prior Publication Data

US 2023/0171340 A1 Jun. 1, 2023

Related U.S. Application Data

(63) Continuation of application No. PCT/KR2022/015741, filed on Oct. 17, 2022.

(30) Foreign Application Priority Data

Oct. 18, 2021 (GB) ..................................... 2114847

(51) Int. Cl.
*H04M 1/72454* (2021.01)
*G06N 3/0442* (2023.01)
*G06N 3/08* (2023.01)

(52) U.S. Cl.
CPC ...... *H04M 1/72454* (2021.01); *G06N 3/0442* (2023.01); *G06N 3/08* (2013.01)

(58) Field of Classification Search
CPC ......... H04M 1/72454; H04M 1/72451; H04M 1/72457; H04M 1/72448; G06N 3/0442;
(Continued)

(56) References Cited

U.S. PATENT DOCUMENTS 10,565,955 B2 2/2020 Wang et al.
11,605,965 B2 3/2023 Lee et al.
(Continued)

FOREIGN PATENT DOCUMENTS

CN 110941411 3/2020
CN 112102780 12/2020
(Continued)

OTHER PUBLICATIONS

Extended Search Report dated Sep. 13, 2024 in European Patent Application No. 22883927.0.
(Continued)

*Primary Examiner* — Juan A Torres
(74) *Attorney, Agent, or Firm* — Nixon & Vanderhye, P.C.

(57) ABSTRACT

A method of for providing personalized management system, the method comprising: obtaining training data comprising respective sets of parameters of the mobile device, including at least one of a frame rate of the display and a refresh rate of the display, and corresponding usage of the mobile device; training the ML algorithm using the provided training data comprising determining relationships between the respective sets of parameters of the mobile device and the corresponding usage of the mobile device; and controlling the mobile device by managing parameters of the mobile device, including at least one of a frame rate of the display and a refresh rate of the display, responsive to the corresponding usage of the mobile device.

20 Claims, 19 Drawing Sheets

(58) Field of Classification Search
CPC ......... G06N 3/08; G06F 1/206; G06F 1/3203; G06F 1/3212; G06F 1/3215; G06F 1/3218; G06F 1/324; G06F 1/3265; G06F 1/3278; G06F 1/3296
USPC .......................................................... 455/566
See application file for complete search history.

(56) References Cited

U.S. PATENT DOCUMENTS

| | | |
|---|---|---|
| 11,688,329 B2 | 6/2023 | Zeng |
| 2010/0052930 A1 | 3/2010 | Grigsby et al. |
| 2015/0379665 A1* | 12/2015 | Kwa ........................ G09G 5/00 345/522 |
| 2016/0062423 A1 | 3/2016 | Kim et al. |
| 2016/0379105 A1 | 12/2016 | Moore, Jr. et al. |
| 2018/0096670 A1 | 4/2018 | Iwaki et al. |
| 2018/0165576 A1 | 6/2018 | Latapie et al. |
| 2018/0197499 A1 | 7/2018 | Wang et al. |
| 2020/0266649 A1 | 8/2020 | Lee et al. |
| 2021/0201731 A1* | 7/2021 | Ranjan ..................... G09G 3/20 |
| 2021/0225320 A1 | 7/2021 | Sin et al. |
| 2022/0375393 A1* | 11/2022 | Zeng ....................... G06F 1/3265 |
| 2023/0222992 A1* | 7/2023 | Zhang ................... G06F 3/1407 345/204 |

FOREIGN PATENT DOCUMENTS

| | | |
|---|---|---|
| CN | 112202962 | 1/2021 |
| CN | 112587920 | 4/2021 |
| CN | 113391684 | 9/2021 |
| GB | 2497082 | 6/2013 |
| KR | 10-2015-0134772 | 12/2015 |
| KR | 10-2016-0027757 | 3/2016 |

OTHER PUBLICATIONS

Search Report and Written Opinion dated Jan. 26, 2023 issued in International Patent Application No. PCT/KR2022/015741.

* cited by examiner

FIG. 6E

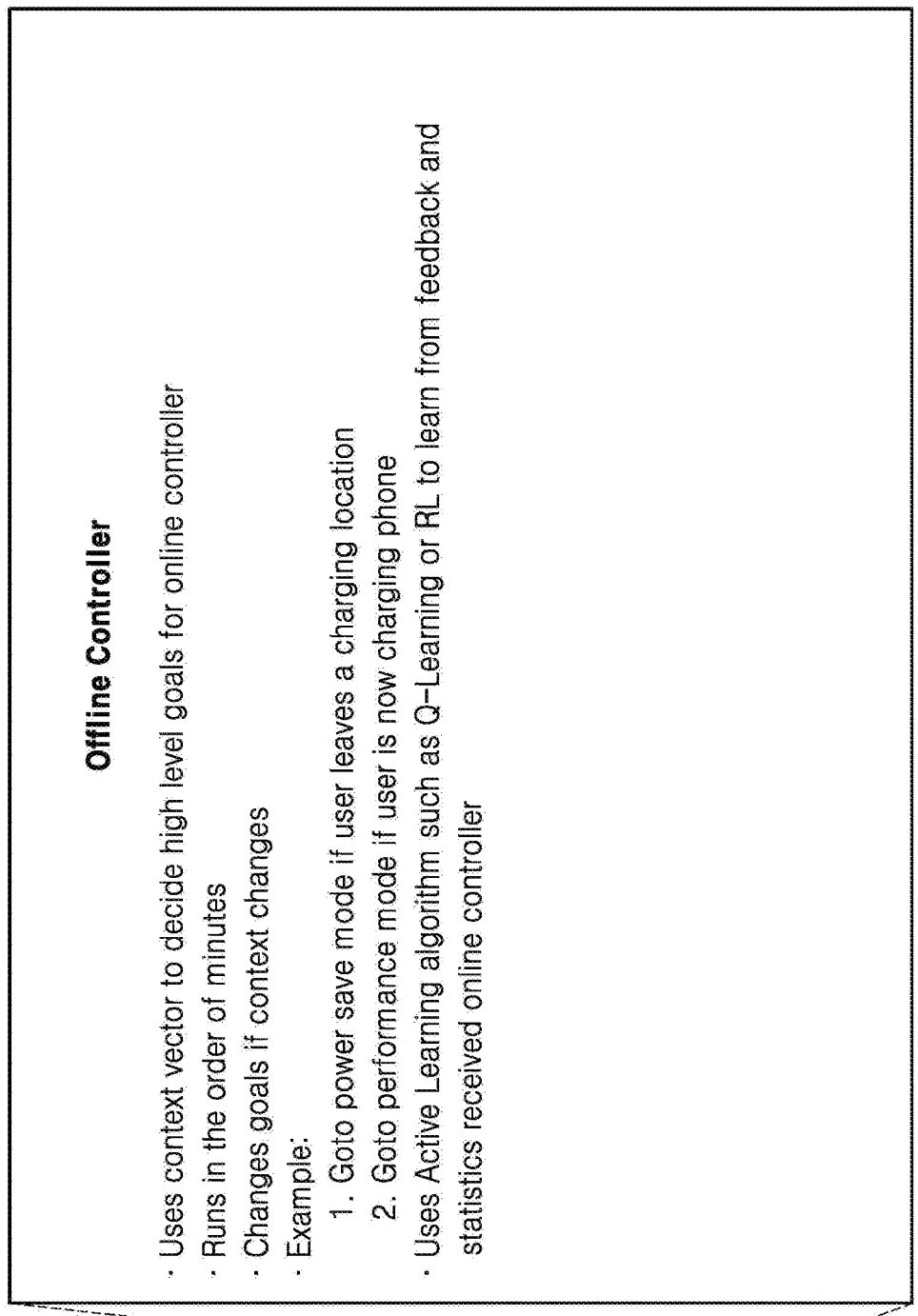

Offline Controller

- Uses context vector to decide high level goals for online controller
- Runs in the order of minutes
- Changes goals if context changes
- Example:
  1. Goto power save mode if user leaves a charging location
  2. Goto performance mode if user is now charging phone
- Uses Active Learning algorithm such as Q-Learning or RL to learn from feedback and statistics received online controller

MOBILE DEVICE AND METHOD FOR PROVIDING PERSONALIZED MANAGEMENT SYSTEM

CROSS-REFERENCE TO RELATED APPLICATIONS

This application is a continuation of International Application No. PCT/KR2022/015741 designating the United States, filed on Oct. 17, 2022, in the Korean Intellectual Property Receiving Office and claiming priority to UK Patent Application No. 2114847.3, filed on Oct. 18, 2021, in the UK Patent Office, the disclosures of which are incorporated by reference herein in their entireties.

BACKGROUND

Field

The present disclosure relates to mobile devices and to methods of controlling mobile devices.

Description of Related Art

Mobile devices, for example mobile phones (also known as smartphones), are typically controlled to provide the highest possible performances for given power budgets and/or thermal budgets. For example, if a temperature of a mobile device is above a pre-determined (i.e. default, factory preset) temperature threshold, performance of the mobile device is attenuated to reduce heat output and hence lower the temperature of the mobile device. For example, if a charge level of a rechargeable battery of the mobile device is below a predetermined charge level threshold, performance of the mobile device is attenuated to decrease power input and hence extend potential usage of the mobile device.

However, there remains a need to improve controlling of mobile devices.

SUMMARY

Embodiments of the disclosure provide a mobile device and a method of controlling a mobile device which at least partially obviates or mitigates at least some of the disadvantages of the prior art, whether identified herein or elsewhere.

In an embodiment, a method for providing personalized management system may be provided. The method may include obtaining training data comprising respective sets of parameters of the mobile device, including at least one of a frame rate of the display and a refresh rate of the display, and corresponding usage of the mobile device. The method may include training the ML algorithm using the provided training data comprising determining relationships between the respective sets of parameters of the mobile device and the corresponding usage of the mobile device. The method may include controlling the mobile device by managing parameters of the mobile device, including at least one of a frame rate of the display and a refresh rate of the display, responsive to the corresponding usage of the mobile device.

In an embodiment, a mobile device for providing personalized management system may be provided. The mobile device may include a display, a rechargeable battery, a memory storing one or more instructions and at least one processor configured to execute the one or more instruction. The at least one processor may be configured to obtain training data comprising respective sets of parameters of the mobile device, including at least one of a frame rate of the display and a refresh rate of the display, and corresponding usage of the mobile device. The at least one processor may be configured to train the ML algorithm using the provided training data comprising determining relationships between the respective sets of parameters of the mobile device and the corresponding usage of the mobile device. The at least one processor may be configured to control the mobile device by managing parameters of the mobile device, including at least one of a frame rate of the display and a refresh rate of the display, responsive to the corresponding usage of the mobile device.

In an embodiment, a computer-readable recording medium having recorded thereon a program for executing the method on a computer may be provided. The method may include obtaining training data comprising respective sets of parameters of the mobile device, including at least one of a frame rate of the display and a refresh rate of the display, and corresponding usage of the mobile device. The method may include training the ML algorithm using the provided training data comprising determining relationships between the respective sets of parameters of the mobile device and the corresponding usage of the mobile device. The method may include controlling the mobile device by managing parameters of the mobile device, including at least one of a frame rate of the display and a refresh rate of the display, responsive to the corresponding usage of the mobile device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6B, 6C, 6D, 6E, and 6F schematically depict the mobile device, in use, in more detail.

DETAILED DESCRIPTION

Figure 1A:
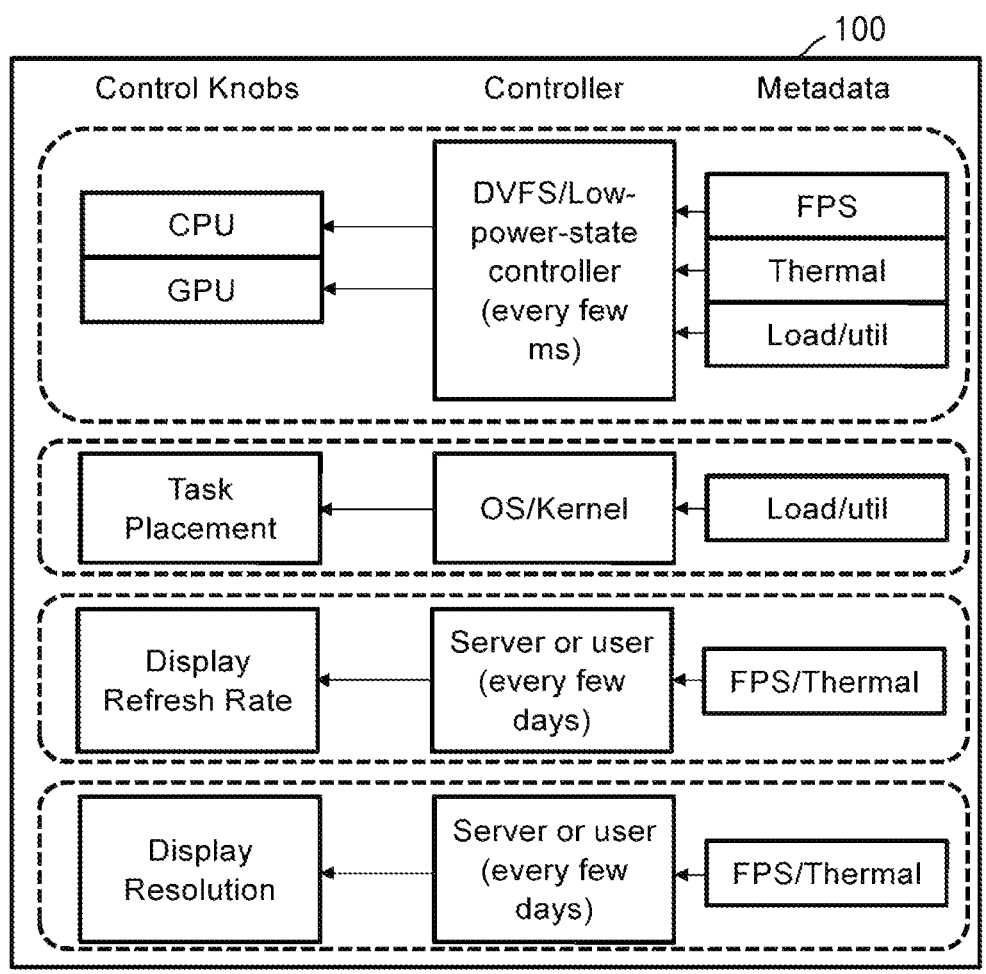
FIG. 1A schematically depicts a conventional mobile device, in detail.

According to the present disclosure there is provided a mobile device and a method of controlling a mobile device, as set forth in the appended claims. Also provided is a method of training a ML algorithm, a trained ML algorithm, a computer, a computer program and a non-transient computer-readable storage medium. Other features of the disclosure will be apparent from the dependent claims, and the description that follows.

Regarding method of training, an embodiment of the disclosure provides a method of training a machine learning, ML, algorithm the method may include obtaining training data comprising respective sets of parameters of the mobile device, including at least one of a frame rate of the display and a refresh rate of the display, and corresponding usage of the mobile device. And the method may include training the ML algorithm using the provided training data comprising determining relationships between the respective sets of parameters of the mobile device and the corresponding usage of the mobile device.

In this way, the ML algorithm is trained to determine (i.e. learn) relationships (i.e. associations) between the respective sets of parameters (i.e. settings, readbacks and/or measured values) of the mobile device, including at least one of the frame rate of the display and the refresh rate of the display, and the corresponding usage (for example, by a user such as a particular user) of the mobile device. For example, a particular user may select to maintain a relatively high frame rate of the display and/or relatively high refresh rate of the display when playing a game, even though a charge level of the rechargeable battery is relatively low (for example, below a predetermined charge level threshold), so as to maintain a relatively high level of user experience of the game because the particular user is arriving at a location for recharging the rechargeable battery of the mobile device. For example, the particular user may select to reduce a relatively high frame rate of the display and/or relatively high refresh rate of the display when playing the game, even though the charge level of the rechargeable battery is relatively high (for example, above a predetermined charge level threshold), if the mobile device is connected to a mobile network rather than Wi-Fi. In this way, the ML algorithm is trained to provide personalised user experience, thereby enabling a method of controlling the mobile device to manages power, performance and thermal (PPT) characteristics of the mobile device, based on historic usage of the mobile device, according to current usage of the mobile device.

In other words, the trained ML algorithm provides Personalized PPT Management System, to intelligently modify frame rate and/or refresh rate of the display based on context and personalized characteristics of user and device. Unlike prior art, this provides personalized performance/power/thermal behaviour based on user behaviour and device behaviour patterns.

The trained ML algorithm provides unique performance management for not only device-type and game, but also every user and their context (time, location, etc). Particularly, use context (i.e. usage) is included as a metric for PPT management.

Generally, each user uses different applications and has different usage patterns of the respective mobile devices. Typically, a particular mobile device is used exclusively by a single user (i.e. individual thereto rather than shared amongst a plurality of users). However, conventional methods of controlling mobile devices to manage PPT characteristics have the same goal (i.e. objective): to provide the highest possible performances for given a power budget and/or thermal budget, typically for a particular mobile device type (i.e. make and model of a mobile device). While such conventional methods may optimise such control for a particular mobile device type and potentially even for a particular application (though not typically for a particular application on a particular mobile device type), such conventional methods do not and cannot optimise such control individually for each user. In contrast, the methods and mobile devices described herein do optimise such control individually (i.e. personalised) for each user, according to current usage, based on historic usage. In this way, user experience of the mobile device is enhanced.

In more detail, each user uses different applications and has different usage patterns of the respective mobile devices. For example, some users predominantly use their mobile devices for audio and/or video calls, such that their mobile devices heat up relatively quickly. For example, some users predominantly use their mobile devices for gaming, such that the power consumption and/or computing resources are relatively high. For example, some users predominantly use their mobile devices for Internet browsing, such that their mobile devices heat up relatively quickly and the power consumption is relatively high. For example, some users only occasionally use their mobile devices, such that heating, power consumption and/or computing resources are relatively low. For example, some users take actions such as to change settings of their mobile devices manually to achieve better gaming experiences. For example if a charge level of the rechargeable battery is relatively low (i.e. low battery), such users typically take actions including turning down the brightness of the mobile device (51% of users), closing all other background applications (43% of users), playing only when the mobile device is charging (43% of users), turning the mobile device to low-power mode (35% of users), using an external power blank (31% of users) and/or turning down the volume on the mobile device (27% of users).

Mobile devices, such as mobile phones, have relatively powerful central processing units (CPUs), graphics processing units (GPUs), cameras, displays, etc., each having different thermal and/or power characteristics. Good user experience requires optimal PPT characteristics. However, conventional methods of controlling mobile devices do not account, for example, for how frequently the user has access to a charging station, what applications are important to the user (for example, some users may prefer a relatively smoother gaming experience but compromise on browsing and/or video call quality) and/or which applications drain the rechargeable battery relatively more quickly. Rather, conventional methods of controlling mobile devices limited to providing the highest possible performances for given a power budget and/or thermal budget, irrespective of usage by a particular user.

Hence, the methods and mobile devices describing herein provide personalised user experience control, utilising user device usage patterns to control the frame rate of the display and/or the refresh rate of the display. As described below in more detail, the methods and mobile devices provide control based on what is termed herein as use context (also abbreviated to context) of a mobile device (i.e. circumstances of use of the mobile device, that form the setting for the control of the mobile device), which thus accounts for usage of the mobile device, including device context (such as a current time, a location of the mobile device, a charging state of the rechargeable battery, a network state of the mobile device, a power saving mode of the mobile device and an application running on the mobile device) and user behaviour (i.e. how the user is using the mobile device). Additionally and/or alternatively, as described below in more detail, the methods and mobile devices provides holistic or synergistic control, by coordinating control of hardware of a mobile device, so as to account for interdependency of the control of the hardware and consequences of control on the hardware.

The method is of training the ML algorithm, for example an Active Learning algorithm, such as Q-Learning or Reinforcement Learning. Other suitable algorithms are known.

In one example, the method comprises pre-training the ML algorithm, for example using training data obtained from a population of users. In this way, control of a new mobile device and/or for a new user is enhanced since the ML algorithm is pre-trained. In one example, the ML algorithm comprises and/or is a pre-trained ML algorithm. In this way, training the pre-trained ML algorithm is accelerated and is optimised for the obtained training data.

The method is implemented, at least in part, by a mobile device comprising the processor and the memory, the display and the rechargeable battery. Mobile devices are known. In one example, the mobile device is a mobile computer, for example a tablet computer, a netbook, a digital media player, an enterprise digital assistant, a graphing calculator, a handheld game console, a handheld PC, a laptop, a mobile Internet device (MID), a personal digital assistant (PDA), a pocket calculator, a portable media player or an ultra-mobile PC; a mobile phone, for example a camera phone, a feature phone, a smartphone or a phablet; a digital camera, for example a digital camcorder, a digital still camera (DSC), a digital video camera (DVC) or a front-facing camera; a pager; a personal navigation device (PND); or a wearable computer. In one example, the mobile device is a smartphone or a handheld game console. It should be understood that the mobile device is controlled by execution, by the processor, of instructions included in the memory. It should be understood that the display is controlled by the processor. It should be understood that the rechargeable battery provides electrical power to the processor, the memory and the display. More generally, the mobile device comprises the processor and the memory, the display and a chargeable battery, for example the rechargeable battery or a non-rechargeable battery. The mobile device comprising a non-rechargeable battery may be as described with respect the mobile device comprising the rechargeable battery mutatis mutandis. It should be understood that the mobile device comprises hardware such as a central processing unit (CPU), a graphics processing unit (GPU), a neural processing unit (NPU), an application-specific integrated circuit (ASIC), a Wi-Fi interface, a mobile network interface, a wireless interface, a camera, a speaker, etc. Other hardware is known.

The method comprises obtaining training data comprising respective sets of parameters of the mobile device, including at least one of a frame rate of the display and a refresh rate of the display, and corresponding usage of the mobile device. That is, the training data are of the mobile device and particularly, the parameters (i.e. settings, readbacks and/or measured values) together with the corresponding usage (i.e. context) of the mobile device.

It should be understood that the frame rate is the rate at which frames to be displayed on the display are generated or stored, for example by a GPU, typically indicated by frames per second (FPS). Controlling the frame rate contributes to power management of the mobile device. For example, increasing the frame rate increases required resources and hence increases power consumption. Conversely, for example, decreasing the frame rate decreases required resources and hence decreases power consumption. It should be understood that the refresh rate is the rate at which new frames are displayed on the display, typically indicated by Hz. A variable refresh rate (VRR) is a dynamic refresh rate that supports a specific range of refresh rates, for example from 30 Hz to 144 Hz. VRR eliminates stutters and caring by keeping the refresh rate in synchronisation with the frame rate, even a dynamic frame rate. VRR contributes to power management since lowering the refresh rate reduces power consumption and thereby saves battery power of a mobile device, for example.

In one example, the training data are obtained from the memory of the mobile device, for example as stored values.

In one example, the parameters of the mobile device include at least one of a temperature of the mobile device, a power consumption of the mobile device, a charge level of the rechargeable battery, a resolution of the display, a brightness of the display, a central processing unit, CPU, utilization of the mobile device, a graphics processing unit, GPU, utilization of the mobile device, a neural processing unit, NPU, utilization of the mobile device, an application-specific integrated circuit, ASIC, utilization of the mobile device and a memory utilization of the mobile device. As described herein, a goal temperature of the mobile device is a threshold temperature thereof, for example measured by sensor closest to the processor. As described herein, an external temperature is ambient temperature and while generally not measured directly, unless a suitable sensor provided, may be modelled. A temperature mismatch or difference may thus arise between the goal temperature and the external temperature. For example, a cover on the mobile device increases temperature while heat sink or fan would cool the mobile device.

It should be understood that the usage of the mobile device corresponds with the respective sets of parameters of the mobile device. That is, particular usage of the mobile device is specific to a particular set of parameters of the mobile device.

In one example, the usage of the mobile device includes at least one of a current time (i.e. actual time of using the mobile device, for example UTC, network time), a location of the mobile device (for example, determined via GPS, mobile network and/or Wi-Fi), a charging state of the rechargeable battery (i.e. not charging, charging, fast charging, wireless charging, slow charging), a network state of the mobile device (for example, connected via mobile network, Wi-Fi, Bluetooth or not connected), a power saving mode of the mobile device (for example, high performance, optimised, medium power saving or maximum power saving) and an application (for example, a game, a streaming app, a browser, a video call) running, enabled, disabled or not enabled on the mobile device. That is, the context of the mobile device it is characterised by when (i.e. current time), where (i.e. location), what (i.e. application) and/or how (i.e. charging state, network state, power saving mode) the mobile device is used. While current time and location are the main parameters to define use context, more generally the use context includes a state of the mobile device and hence any parameter (including as described above) that may be set as/or measured by, about and/or for the mobile device, that changes over time, such as a charge level of the rechargeable battery, application usage (using/not using), system toggles (e.g. Wi-Fi, Bluetooth, brightness, power saving mode) and other distinct measurable states that can be included by expert designer.

The method comprises training the ML algorithm using the provided training data comprising determining relationships between the respective sets of parameters of the mobile device and the corresponding usage of the mobile device. That is, the ML algorithm learns relationships (i.e. associations) between the respective sets of parameters of the mobile device and the corresponding usage (for example, by a user such as a particular user) of the mobile device, thereby enabling optimised control of the mobile device for the particular user (i.e. personalised control).

In one example, determining relationships between the respective sets of parameters of the mobile device and the corresponding usage of the mobile device comprises detecting actions relating to usage of the mobile device by a user and recognizing patterns of the detected actions.

In this way, patterns of actions relating to usage of the mobile device by the user are recognised and the ML algorithm is trained using these recognised patterns. In one example, the actions include: being at a particular location or changing a location of the mobile device (for example, determined via GPS, mobile network and/or Wi-Fi), changing a charging state of the rechargeable battery (i.e. from not charging, charging, fast charging, wireless charging, slow charging to another of charging, charging, fast charging, wireless charging, slow charging), changing a network state of the mobile device (for example, from connected via mobile network, Wi-Fi, Bluetooth or not connected to another of connected via mobile network, Wi-Fi, Bluetooth or not connected), changing a power saving mode of the mobile device (for example, from high performance, optimised, medium power saving or maximum power saving to another of high performance, optimised, medium power saving or maximum power saving) and/or changing an application (for example, a game, a streaming app, a browser, a video call) from running, enabled, disabled or not enabled to another of running, enabled, disabled or not enabled.

In one example, the actions include: changing a maximum permissible temperature of the mobile device (for example increasing the maximum permissible temperature of the mobile device if the user is comfortable at the increased maximum permissible temperature, noting that typically the maximum permissible temperature is limited by user comfort rather than the hardware of the mobile device), changing a resolution of the display, changing a brightness of the display, changing a colour mode of the display.

In one example, determining relationships between the respective sets of parameters of the mobile device and the corresponding usage of the mobile device comprises inferring a use context of the mobile device. This is a novel algorithm to understand user device usage patterns for PPT management and uses key metrics determined by charging pattern, user-location, time-of-day, system settings and other app-usage to personalise performance learning a context model. In one example, inferring a use context of the mobile device comprises learning a context model, for example as described below.
  1. Run Offline in Background;
  2. Store model in memory;
     State (s)=Current Time (t), Location (l), Event (e)
     Model (m) encapsulates states (s1, s2, . . . sN) to capture user behaviour via a Markov-chain or LSTM or other recurrent neural networks
     Such a model will provide for any given Location (l) or Time (t)
     Probability of event (Pe)
     Pe=fn(l, t)
     This probability Pe for several system events [charging, system toggle states, opening apps, etc.] make a vector which is the context input to Smart Performance Adjuster In one example, the method comprises storing the context model, for example in form of a neural network or a look-up table. In one example, the method comprises processing the context model, for example to remove outliers or impossible actions to improve reliability. In one example, the method comprises combining similar states to reduce dimensionality of a context vector. In one example, the method comprises calculating a context vector from the learned context model for the usage. In this way, the use context (i.e. usage) is converted to abstract metrics capable to interfacing with OS power/thermal managers. For example, the usage may be converted to embeddings space which is then fed into a reinforcement learning (RL) algorithm. In one example, determining relationships between the respective sets of parameters of the mobile device and the corresponding usage of the mobile device comprises calculating respective context vectors from a learned context model, as described previously.

Regarding method of controlling, an embodiment of the disclosure provides a method of controlling a mobile device. And, the method may include controlling, by a trained machine learning, ML, algorithm, the mobile device, comprising managing parameters of the mobile device, including at least one of a frame rate of the display and a refresh rate of the display, responsive to corresponding usage of the mobile device.

In this way, the mobile device is controlled in response to usage of the mobile device by the trained ML algorithm, thereby providing personalised user experience and hence manages power, performance and thermal (PPT) characteristics of the mobile device, based on historic usage of the mobile device, according to current usage of the mobile device.

The mobile device, the processor, the memory, the display, the rechargeable battery the ML algorithm, the parameters, the frame rate of the display, the refresh rate of the display and/or the usage of the mobile device may be as described with respect to an embodiment of the disclosure.

In one example, the ML algorithm is trained according to the method of an embodiment of the disclosure.

In one example, managing the parameters of the mobile device responsive to the corresponding usage of the mobile device comprises predicting an action relating to usage of the mobile device by a user and managing the parameters of the mobile device responsive to the predicted action. The action may be as described with respect to an embodiment of the disclosure. In this way, in response to predicting (i.e. inferring) the action based on training data, for example, the parameters of the mobile device are managed accordingly. For example, if the predicted action is changing of a charging state of the rechargeable battery from not charging to fast charging, based on a current time and/or location of the mobile device, controlling of the mobile device may comprise maintaining a relatively high frame rate of the display and/or relatively high refresh rate of the display when playing a game, even though a charge level of the rechargeable battery is relatively low (for example, below a predetermined charge level threshold), so as to maintain a relatively high level of user experience of the game, because the particular user is predicted to arrive at a location for recharging the rechargeable battery of the mobile device.

In one example, the action is at least one of changing a location of the mobile device, changing a charging state of the rechargeable battery, changing a network state of the mobile device and changing an application running on the mobile device, as described with respect to an embodiment of the disclosure.

In one example, managing the parameters of the mobile device responsive to the corresponding usage of the mobile device comprises maintaining a parameter of the mobile device outside a default range thereof. That is, contrary to default behaviour of the mobile device, the parameter is maintained outside of the default range, for example above a default maximum permissible temperature.

In one example, maintaining the parameter of the mobile device outside the default range thereof is responsive to an action by a user of the mobile device. The action may be as described with respect to an embodiment of the disclosure. For example, the user may have previously selected to maintain a relatively high frame rate of the display and/or relatively high refresh rate of the display when playing a game, even though a charge level of the rechargeable battery is relatively low (for example, below a predetermined charge level threshold), so as to maintain a relatively high level of user experience of the game because the particular user is arriving at a location for recharging the rechargeable battery of the mobile device. In one example, managing the parameters of the mobile device responsive to the corresponding usage of the mobile device comprises restoring a parameter of the mobile device inside a default range thereof. For example, the frame rate of the display and/or the refresh rate of the display maybe reduced if a particular application, such as a game, is no longer running on the mobile device.

In one example, managing the parameters of the mobile device responsive to the corresponding usage of the mobile device comprises calculating a context vector from a learned context model, as described with respect to an embodiment of the disclosure.

In one example, managing the parameters of the mobile device comprises querying probability of and/or a time of an action (also known as an event) and/or a usage pattern. For example, a likelihood and/or time of next charging may be queried.

In one example, the method comprises training the ML algorithm according to an embodiment of the disclosure.

Regarding mobile device, an embodiment of the disclosure, provides a mobile device comprising a processor and a memory, a display and a rechargeable battery, wherein the processor is configured to execute instructions implementing a trained machine learning, ML, algorithm for controlling the mobile device, comprising managing parameters of the mobile device, including at least one of a frame rate of the display and a refresh rate of the display, responsive to corresponding usage of the mobile device.

The mobile device, the processor, the memory, the display, the rechargeable battery, the ML algorithm, the parameters, the frame rate of the display, the refresh rate of the display and/or the usage of the mobile device may be as described with respect to the embodiment of the disclosure.

In one example, the mobile device (100) comprises a set of hardware controllers, including a power/dynamic voltage and frequency scaling, DVFS, controller, a scheduler and a display controller, and a device controller (110), wherein the device controller (110) is configured to coordinate control of the set of hardware controllers according to the managed parameters.

In more detail, optimising PPT characteristics to provide a good user experience may include:
  Performance: highest frame rate of the display and/or refresh rate of the display; and/or
  Power: lowest power consumption; and/or
  Thermal: comfortable to be held by the user (i.e. not so hot as to be uncomfortable to the user and hence at most a threshold temperature, that may be user-specific).

Conventionally, control knobs are used to set parameters of the mobile device, such as control knobs for CPU and/or GPU dynamic voltage and frequency scaling (DVFS), power-down, scheduling, refresh rate and display resolution.

FIG. 1A schematically shows conventional control knobs for CPU and/or GPU DVFS, task placement, refresh rate and display resolution. Individual, independent hardware controllers are associated with each of these conventional control knobs, specifically a DVFS controller for CPU and/or GPU DVFS, an OS/kernel controller for task placement, a server controller or the user for refresh rate and a server controller or the user for refresh rate for display resolution. Inputs to these individual, independent hardware controllers include metadata, specifically FPS, thermal (e.g. heating), load/utilisation for the DVFS controller, load/utilisation for the OS/kernel controller and FPS/thermal for the servo controllers. It should be understood that these individual, independent hardware controllers control the respective control knobs independently, without any coordination or overarching control. That is, each individual, independent hardware controller controls the respective control knob based only on the input metadata, without consideration or influence by or on the other controllers. For example, increasing CPU and/or GPU speeds increases power consumption, resulting in further heating of the mobile device (100) which in turn adversely affects the CPU and/or GPU speeds, together with the maximum tolerable refresh rate and/or display resolution, and vice versa. Increasing and decreasing the refresh rate and/or the display resolution similarly affect the mobile device (100) mutatis mutandis, while increased or decreased load/utilisation affect the CPU and/or the GPU and/or task placement. That is, even though the consequences of a change to the mobile device (100) (more generally, of a use context of the mobile device (100) as described below) are interdependent, conventional control of the mobile device (100) does not account for this interdependency.

In other words, conventionally, each performance controller works separately—CPU, GPU, Network, etc. Further, conventionally, controller settings are not context dependent—mostly, controllers have same settings regardless of the situation. For example, a maximum (permissible) temperature of the mobile device (100) is same (and set from a server). Furthermore, conventionally, when controllers are dependent on location/time, they are specific to one controller, e.g. 5G→WiFi. That is, conventionally controllers do not speak (i.e. interact) with each other.

However, the inventors have identified that the control knobs (120) may be holistically or synergistically controlled (i.e. in coordination, with overarching control), so as to improve control of the mobile device (100) and hence PPT characteristics thereof. That is, control of the mobile device (100) as described herein does account for the interdependency of changes to the mobile device (100) (more generally, of a use context of the mobile device (100) as described below).

In other words, to enhance user-experience, the controllers work together—CPU, GPU, Network, etc. Further, the controller settings are context dependent—the mobile device (100) learns from the use context and changes behaviour and is personalized for every user.

Figure 1B:
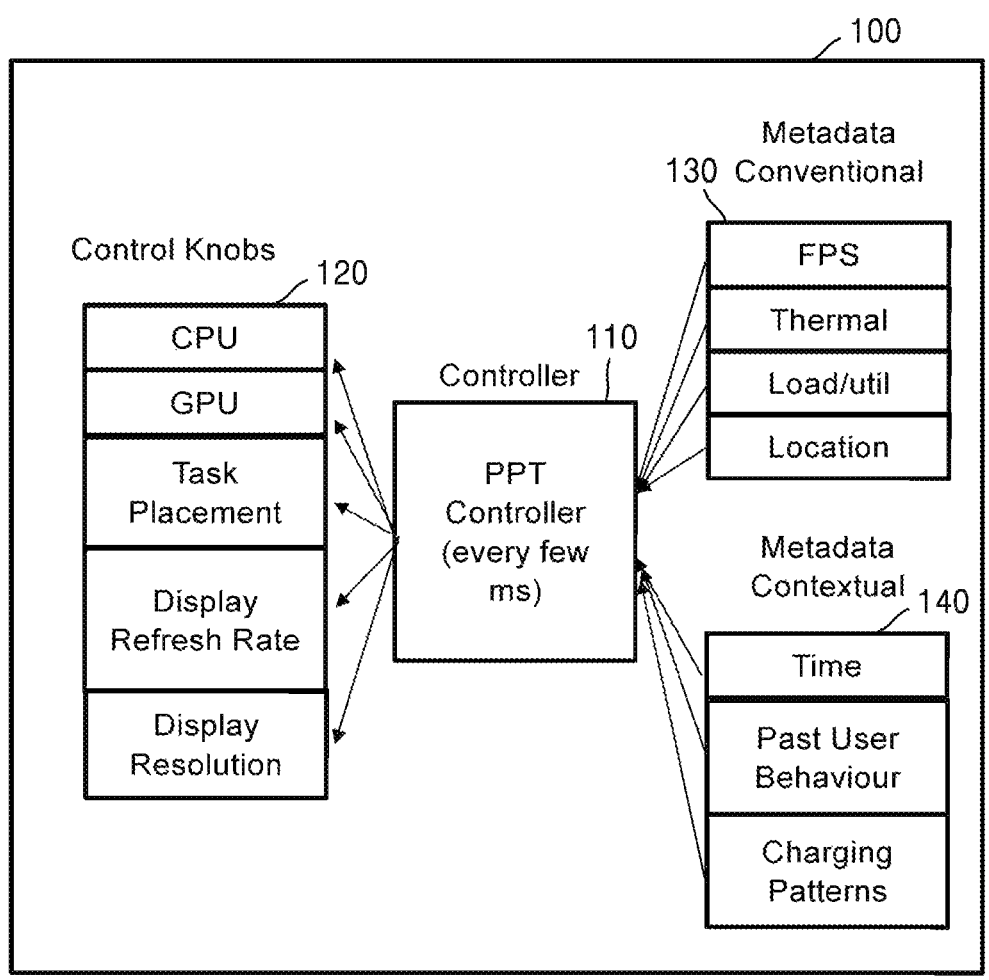
FIG. 1B schematically depicts a mobile device according to an exemplary embodiment, in detail.

FIG. 1B schematically shows a device controller (110), termed PPT controller, for a mobile device (100) according to an exemplary embodiment, that performs the function of coordinating control of the conventional hardware controllers, thereby improving control of the mobile device (100) and hence PPT characteristics thereof. Particularly, the device controller (110) is configured to coordinate control of the set of hardware controllers according to the managed parameters.

In addition to the conventional metadata (130), inputs to the device controller (110) includes contextual metadata (140), enabling control of the mobile device (100) based on what is termed herein as use context (also abbreviated to context) of the mobile device (100) (i.e. circumstances of use of the mobile device, that form the setting for the control of the mobile device), which thus accounts for usage of the mobile device, including device context (such as a current time, a location of the mobile device, a charging state of the rechargeable battery, a network state of the mobile device, a power saving mode of the mobile device (100) and an application running on the mobile device) and user behaviour (i.e. how the user is using the mobile device). Use context is also known and/or includes a state of the mobile device.

In one example, the mobile device (100) comprises a context inference engine, configured to identify usage (i.e. use context) of the mobile device (100) using contextual metadata (140), as described previously. In one example, the context inference engine is configured to learn a context model, for example as described with respect to the embodiment of the disclosure. In one example, the context inference engine is configured to store the context model in the memory, as described with respect to the embodiment of the disclosure. In one example, the context inference engine is configured to process the context model, as described with respect to the first aspect. In one example, the context inference engine is configured to calculate a context vector from the learned context model for the usage of the mobile device.

In one example, the device controller (110) comprises an offline controller and an online controller. Generally, offline controllers for mobile devices are configured to control over relatively longer timescales (e.g. over minutes) while online controllers for mobile devices are configured to control over relatively shorter timescales (e.g. a response time of <50 ms).

In one example, the offline controller is configured to use a context vector to decide an objective (i.e. a goal) of the online controller. In one example, the offline controller is configured to decide a new objective if the context vector changes.

Example

Goto power save mode if user leaves a charging location
Goto performance mode if user is now charging phone
In one example, the offline controller is configured to use an Active Learning algorithm, such as Q-Learning or Reinforcement Learning, to learn from feedback and/or statistics received from the online controller.

In one example, the online controller is configured to actively (i.e. dynamically, in real time) control parameters of the mobile device, such as system states, display, CPU, GPU, Power, etc.

In one example, the online controller is configured to use an Active Learning algorithm, such as Q-Learning or Reinforcement Learning. In one example, the online controller is configured to control based on global requirements (such as temperature, power, performance target, etc.). In one example, the online controller this configured to transmit feedback such as statistics, for example periodically, to the offline controller.

In one example, the mobile device (100) comprises a set of sensors, including a temperature sensor and a rechargeable battery sensor. In this way, a temperature and a charging level of the rechargeable battery may be sensed.

Computer, Computer Program, Non-Transient Computer-Readable Storage Medium, ML Algorithm An embodiment of the disclosure provides a computer comprising a processor and a memory configured to implement the method.

An embodiment of the disclosure provides a computer program comprising instructions which, when executed by a computer comprising a processor and a memory, cause the computer to perform a method according to the method.

An embodiment of the disclosure provides a non-transient computer-readable storage medium comprising instructions which, when executed by a computer comprising a processor and a memory, cause the computer to perform a method according to the method.

An embodiment of the disclosure provides a machine learning, ML, algorithm trained according to the method according to the method. Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

FIG. 1A schematically depicts a conventional mobile device, in detail, as described previously. FIG. 1B schematically depicts a mobile device according to an exemplary embodiment, in detail.

In this example, the mobile device (100) comprises a set of hardware controllers, including a power/dynamic voltage and frequency scaling, DVFS, controller, a scheduler and a display controller, and a device controller (110), wherein the device controller (110) is configured to coordinate control of the set of hardware controllers according to the managed parameters.

In more detail, FIG. 1B schematically shows a device controller (110), termed PPT controller, for a mobile device (100) according to an exemplary embodiment, that performs the function of coordinating control of the conventional hardware controllers, thereby improving control of the mobile device (100) and hence PPT characteristics thereof. Particularly, the device controller (110) is configured to coordinate control of the set of hardware controllers according to the managed parameters.

In addition to the conventional metadata (130), inputs to the device controller (110) includes contextual metadata (140), enabling control of the mobile device (100) based on what is termed herein as use context (also abbreviated to context) of the mobile device (100) (i.e. circumstances of use of the mobile device, that form the setting for the control of the mobile device), which thus accounts for usage of the mobile device, including device context (such as a current time, a location of the mobile device, a charging state of the rechargeable battery, a network state of the mobile device, a power saving mode of the mobile device (100) and an application running on the mobile device) and user behaviour (i.e. how the user is using the mobile device). Use context is also known and/or includes a state of the mobile device.

Figure 2A:
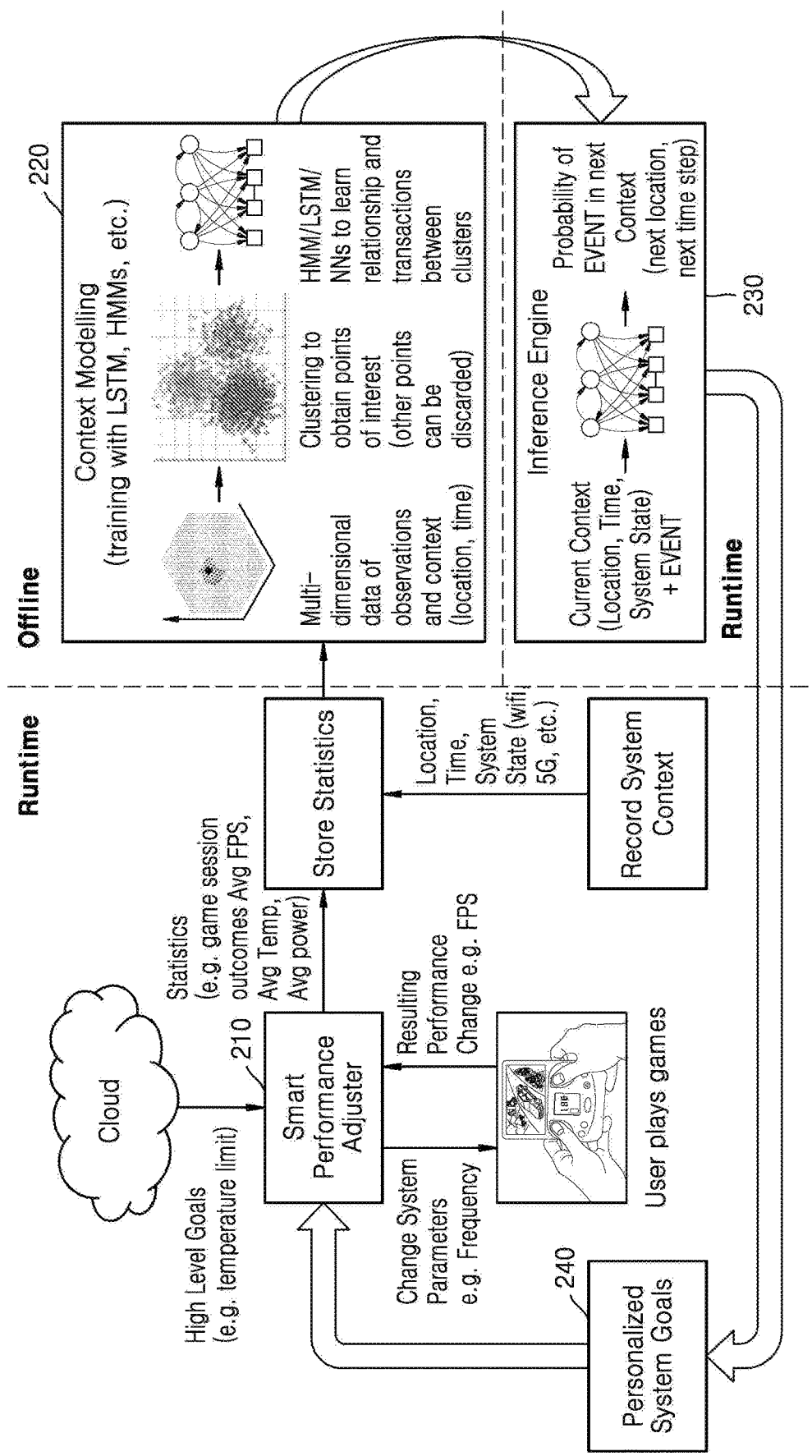
FIG. 2A schematically depicts a method according to an exemplary embodiment.
Figure 2B:
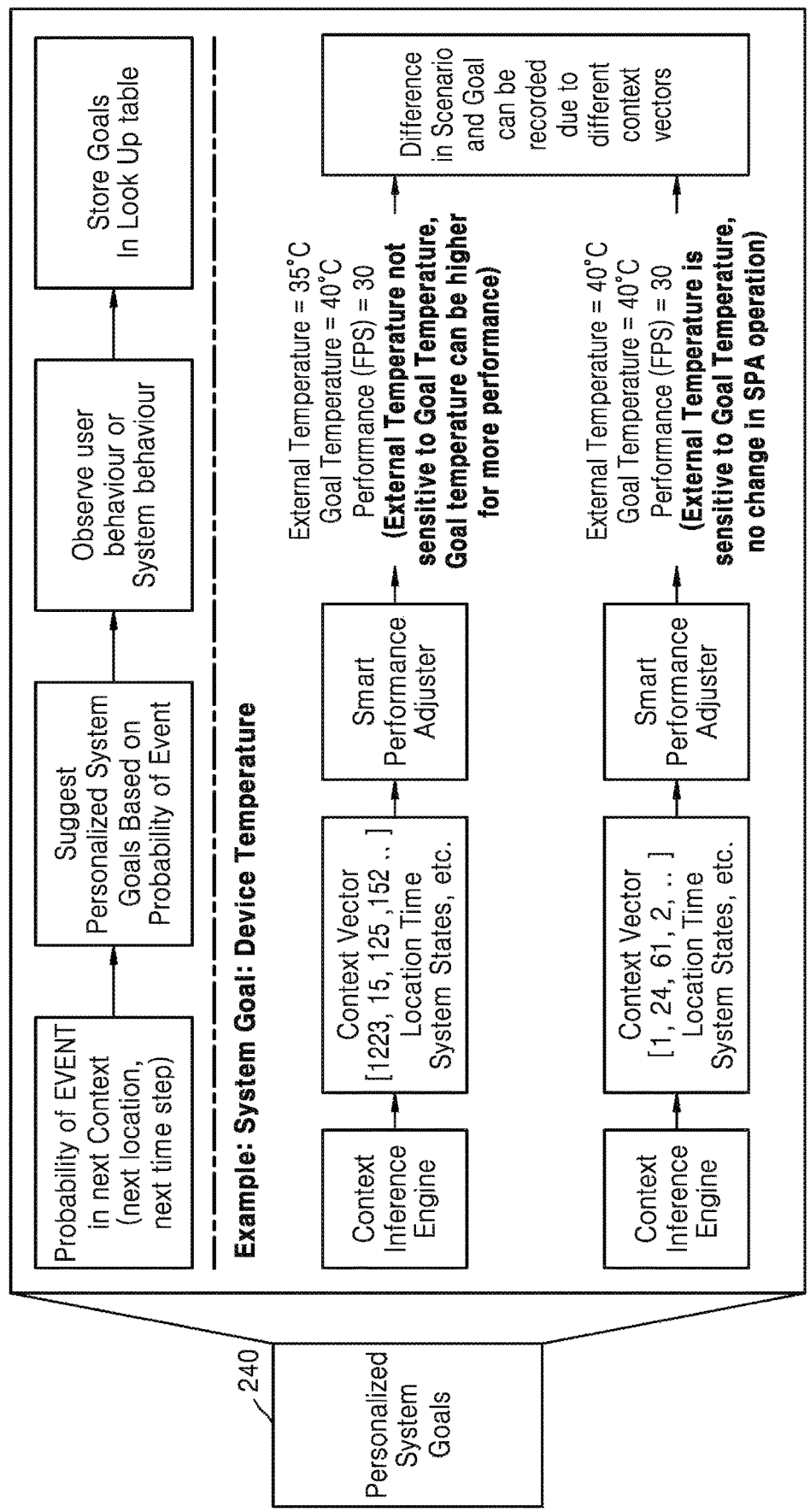
FIG. 2B schematically depicts the method, in more detail.

FIG. 2A schematically depicts a method according to an exemplary embodiment; and FIG. 2B schematically depicts the method, in more detail.

In this example, the Smart Performance Adjuster (SPA) (210) (i.e. the device controller) obtains high-level goals (for example temperature limits for the mobile device) from a server, such as via the cloud. At runtime, while a user uses the mobile device, for example plays a game thereon, the SPA (210) changes system parameters (for example DVFS) and observes resulting performance changes (for example FPS) of the mobile device. The SPA (210) outputs statistics (for example, game session outcomes, average FPS, average temperature, average power) which are stored, together with a record of system context (for example location, time, system state such as Wi-Fi, 5G, etc.).

Offline, the stored statistics are used for context modelling (220), such as training with LSTM, HMMs, NNs, etc. In more detail, the statistics (i.e. multidimensional data of observations of the mobile device) and context are process, for example by clustering to obtain points of interest (other points may be discarded).

The LSTM, HMMs, NNs, etc. of the inference engine (230) are trained to learn relationships and transactions between the clusters. At runtime, the trained LSTM, HMMs, NNs, etc. are used to estimate a probability of an event for a particular context, for example the next context such as a next location and/or a next time step, such as in response to a query from the SPA (210). The probability of the event is provided to the SPA (210), via and/or based on personalised system goals (240), which in turn changes system parameters of the mobile device (100) at runtime, as described previously. That is, the mobile device (100) provides learned feedback control such that the SPA (210) changes system parameters of the mobile device (100) at runtime using probabilities estimated by the inference engine (230) that is trained using statistics and context obtained of the mobile device.

FIG. 2B schematically depicts personalised system goals (240), in more detail. Generally, the probability of the event in the next context, for example the next location and/or the next time step, is queried from the inference engine (230) and personalised system goals (240) suggested based on the probability of the event. The mobile device (100) the user behaviour and/or system behaviour and stores goals thereof in a lookup table. By way of example, FIG. 2B illustrates a system goal of device temperature. Other goals may be exemplified mutatis mutandis.

Figure 3A:
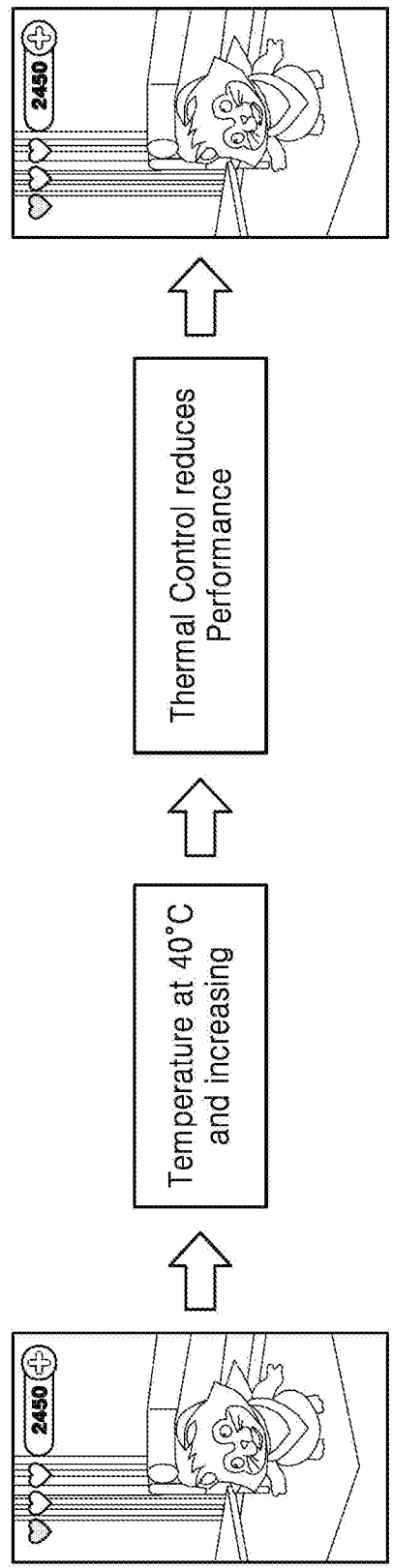
FIG. 3A schematically depicts a conventional method.

FIG. 3A schematically depicts a conventional method, for scenario 1 (user gaming and high-temperature). Conventionally, if the temperature is at 40° C. and increasing, for example, the thermal control in response reduces performance of the mobile device.

Figure 3B:
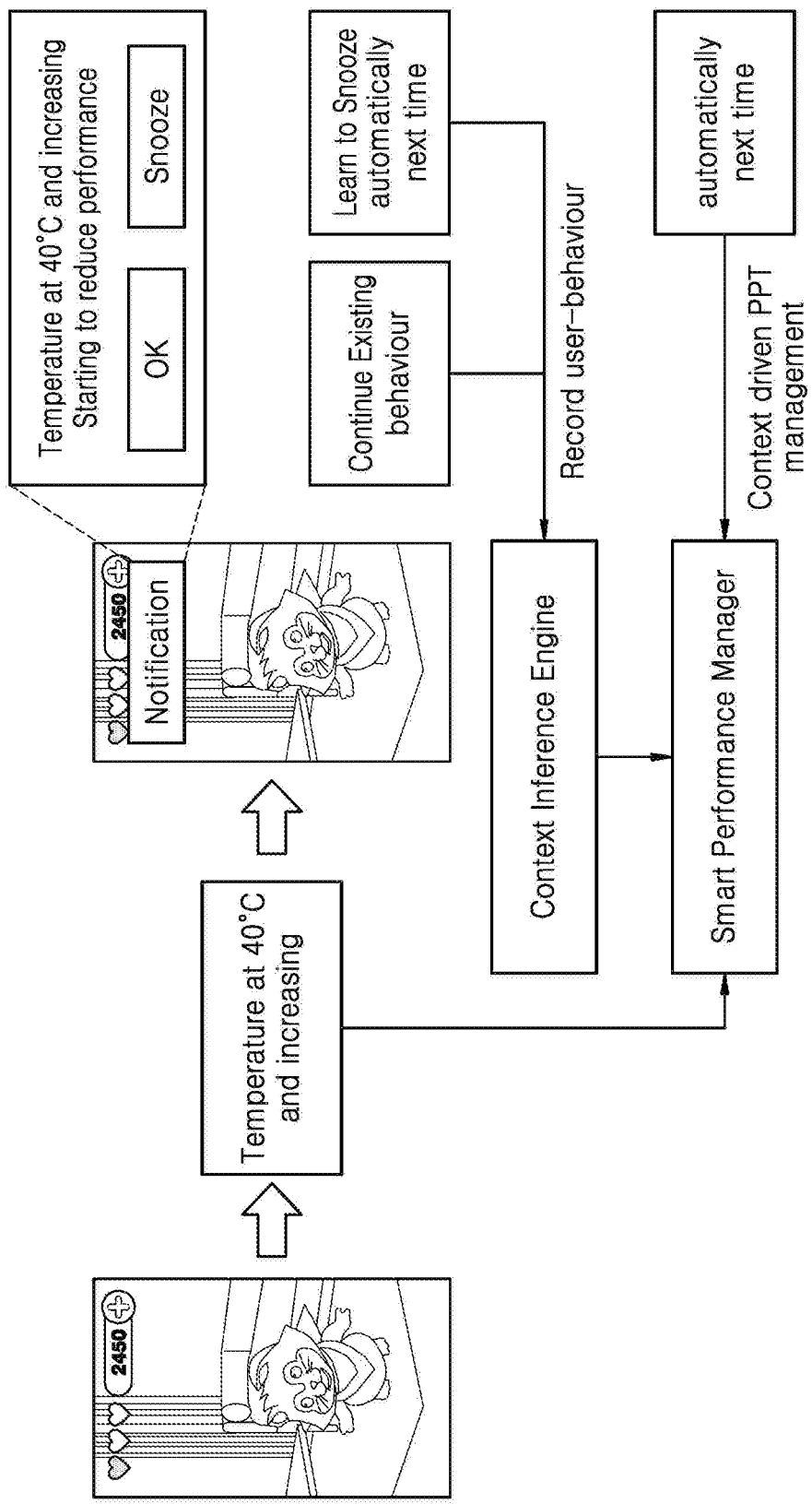
FIG. 3B schematically depicts a method according to an exemplary embodiment.

FIG. 3B schematically depicts a method according to an exemplary embodiment, for scenario 1 (user gaming and high-temperature). In contrast to the conventional method, if the temperature is at 40° C. and increasing, for example, the mobile device (100) displays a notification on the display thereof, for example using a GUI, notifying the user that the temperature is at 40° C. and increasing and that the mobile device (100) is starting to reduce performance. The user may respond by accepting the reduced performance, via an OK button on the GUI, or by deferring the reduced performance, via a Snooze button on the GUI. If the user presses the okay button, the mobile device (100) continues with the existing behaviour while if the user presses the Snooze button, the mobile device (100) learns to automatically Snooze next time (i.e. at such a next event). The mobile device (100) records the user response, which is forwarded to the context inference engine. The SPA uses inferences provided by the context inference engine, together with context driven PPT management such as with respect to maintaining high performance, to control the mobile device (100) at runtime, such as if the temperature is at 40° C. and increasing.

Figure 4A:
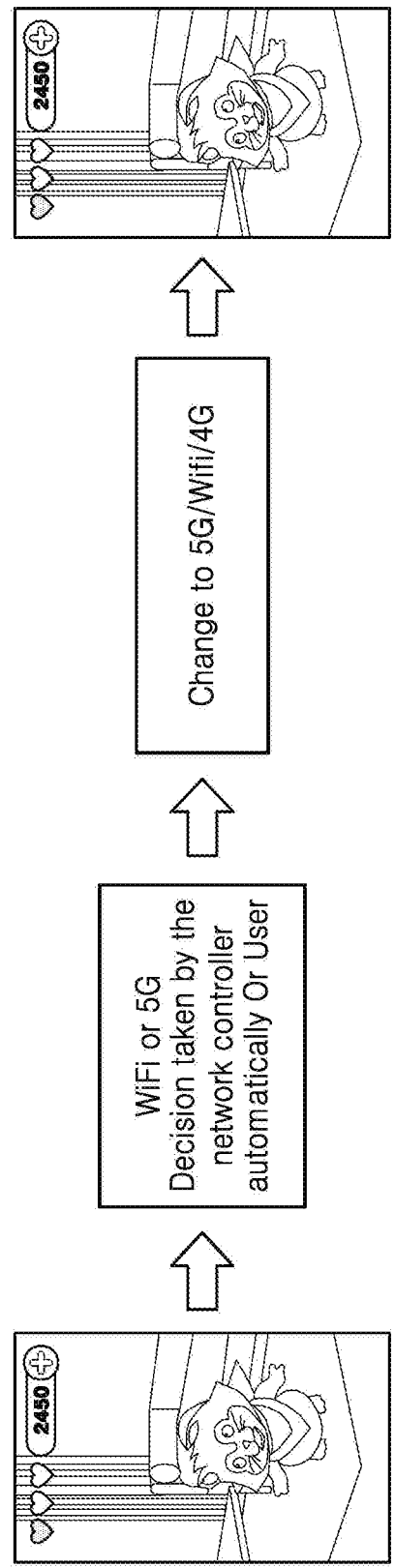
FIG. 4A schematically depicts a conventional method

FIG. 4A schematically depicts a conventional method, for scenario 2 (user gaming and 5G networks). Conventionally, a decision to switch between Wi-Fi and 5G (and/or 4G) is taken automatically by the network controller or manually by the user. However, such a decision conventionally does not take into account other factors such as location, time, impact on game performance, etc.

Figure 4B:
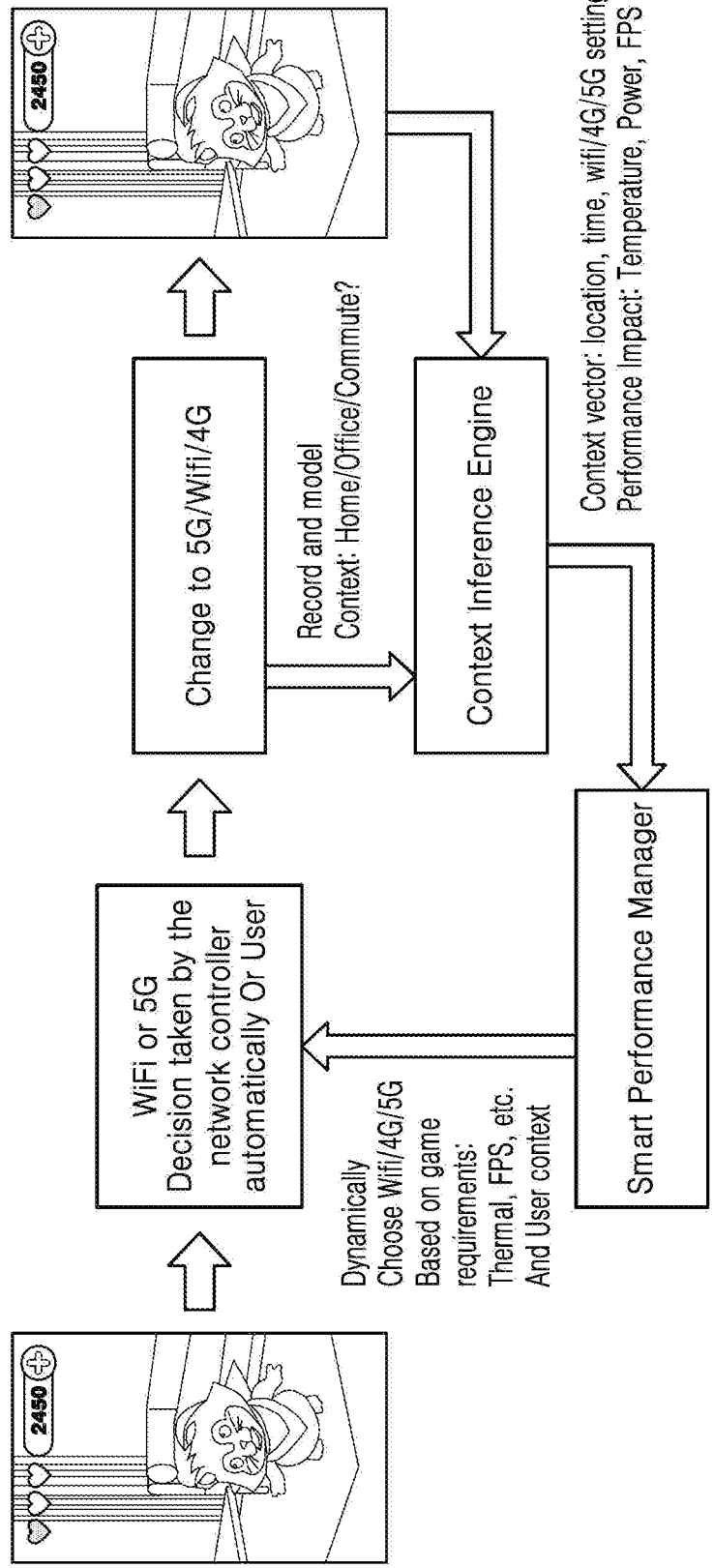
FIG. 4B schematically depicts a method according to an exemplary embodiment.

FIG. 4B schematically depicts a method according to an exemplary embodiment, for scenario 2 (user gaming and 5G networks). In contrast to the conventional method, a decision to switch between Wi-Fi and 5G (and/or 4G) is taken automatically by the network controller or manually by the user. The mobile device (100) records the decision, together with the context (for example home, office, commuting), which is forwarded to the context inference engine. The SPA uses inferences provided by the context inference engine, together with context driven PPT management such as with respect to performance impact for example temperature, power, FPS, to control the mobile device (100) at runtime, so as to take the decision automatically whether to switch between Wi-Fi, 5G and/or 4G, based on the performance impact and the context.

Other scenarios include:

User battery below 5%: reduce screen brightness but if user decides to increase brightness again, learn and do not adjust brightness in same context.

User battery below 5%: expected phone on-time is 10 minutes and show notification to reduce performance to extend phone on-time or continue at current performance Based on response from user, learn user behaviour and incorporate.

Figure 5:
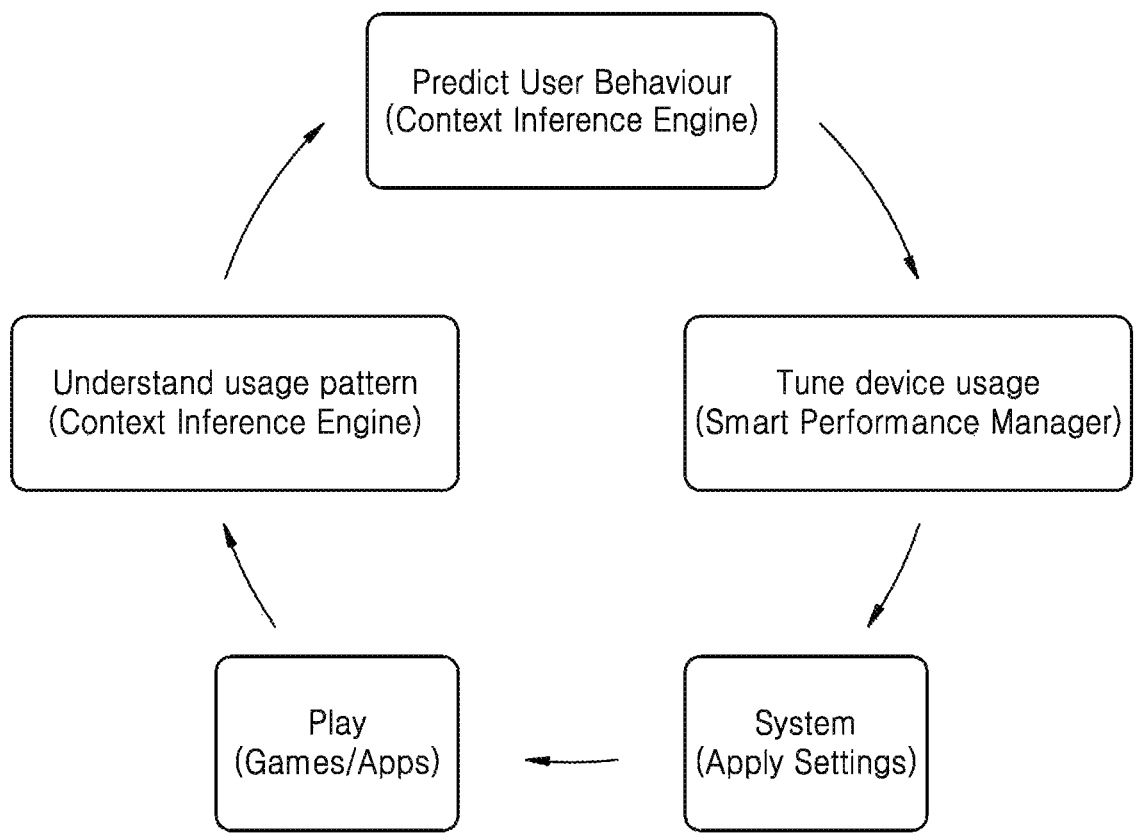
FIG. 5 schematically depicts a method according to an exemplary embodiment.

FIG. 5 schematically depicts a method according to an exemplary embodiment.

1. Understand Device Usage Pattern

Device contains context inference engine which will collect device usage data and understands usage patterns.

2. Predict Device Charging Patterns

Context inference engine based on the usage patterns, generates prediction of charging patterns.

3. Understands Performance Behaviour of Game/Browser/Application

Power manager monitors maximum and minimum frame rate and game/browser/other application.

Understand complexity of the scene with GPU/CPU load information.

Gather battery drain rate.

4. Personalize Performance for User/Application

Figure 6A:
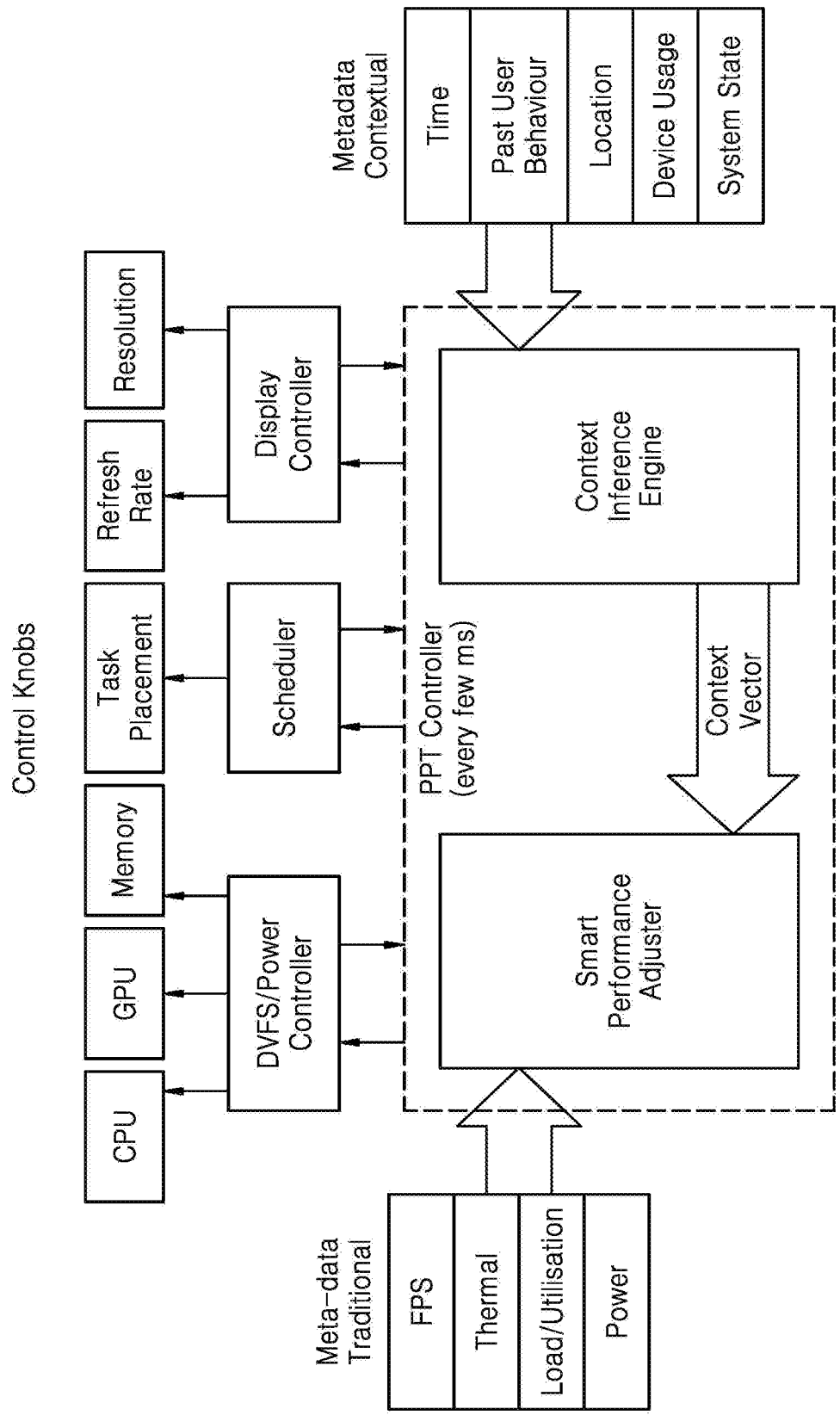
FIG. 6A schematically depicts a mobile device according to an exemplary embodiment, in use.
Figure 6B:
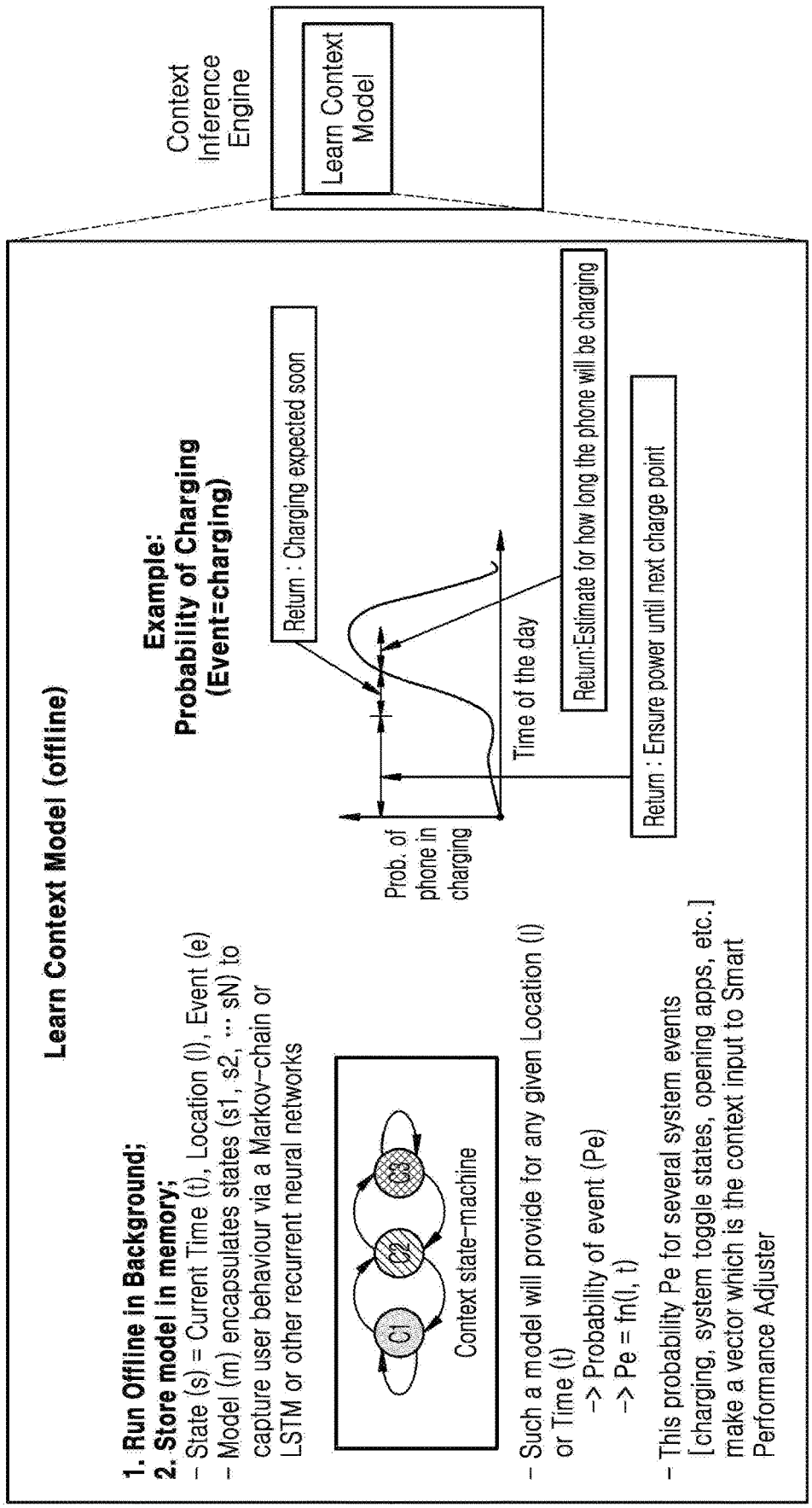
Figure 6C:
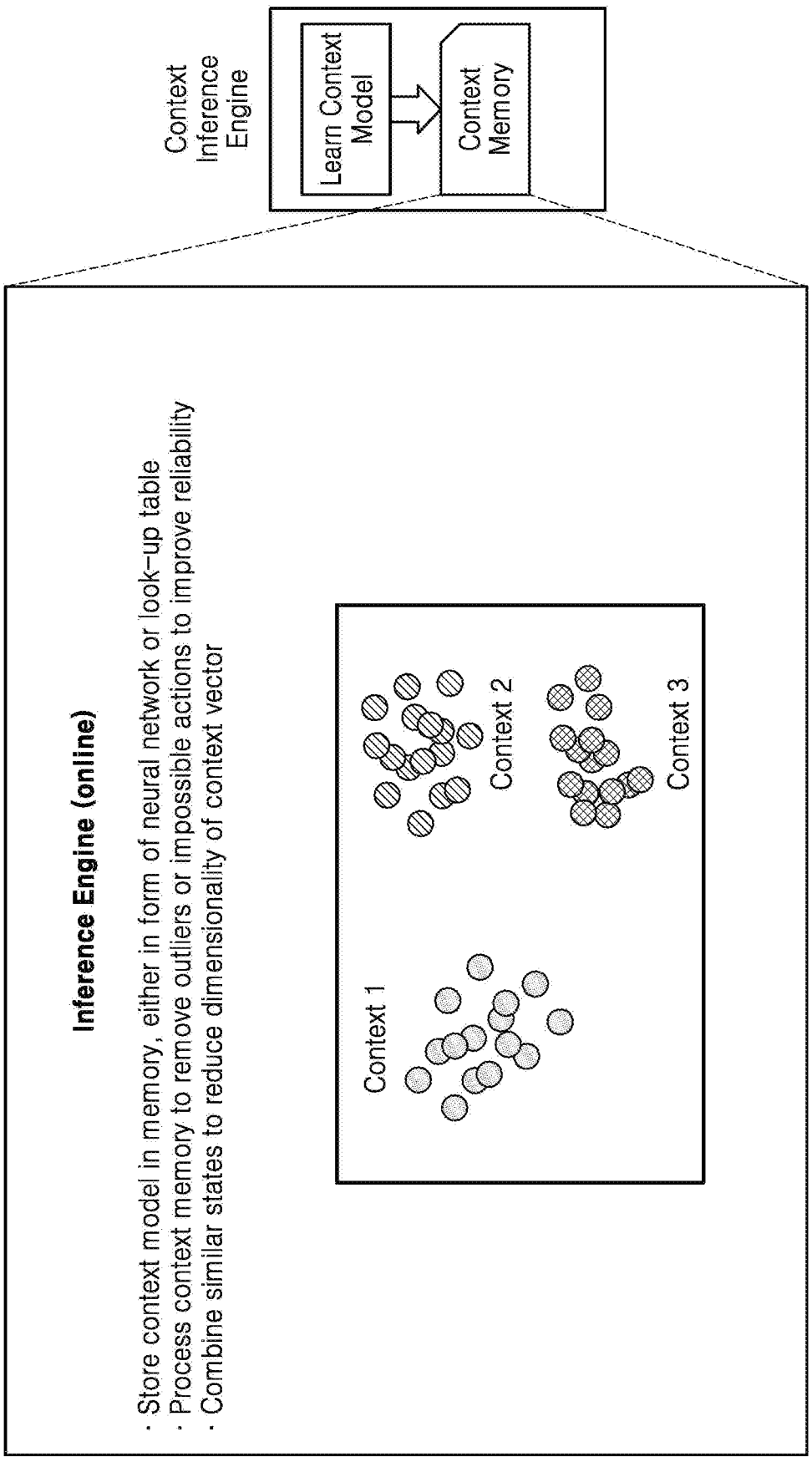

Smart Performance Manager queries Context Inference Engine potential next charging time Based on the next charge time, game behaviour, complexity of the scene, battery drain rate, games frame rate and device usage pattern (gamer/internet browser/camera user etc.), personalised performance manager sets variable refresh rates such that user will have stable/longer performance FIG. 6A schematically depicts a mobile device (100) according to an exemplary embodiment, in use; and FIGS. 6B to 6F schematically depict the mobile device, in use, in more detail.

The context inference engine is trained using contextual metadata (time, past user behaviour, location, device usage and systems state).

Figure 6D:
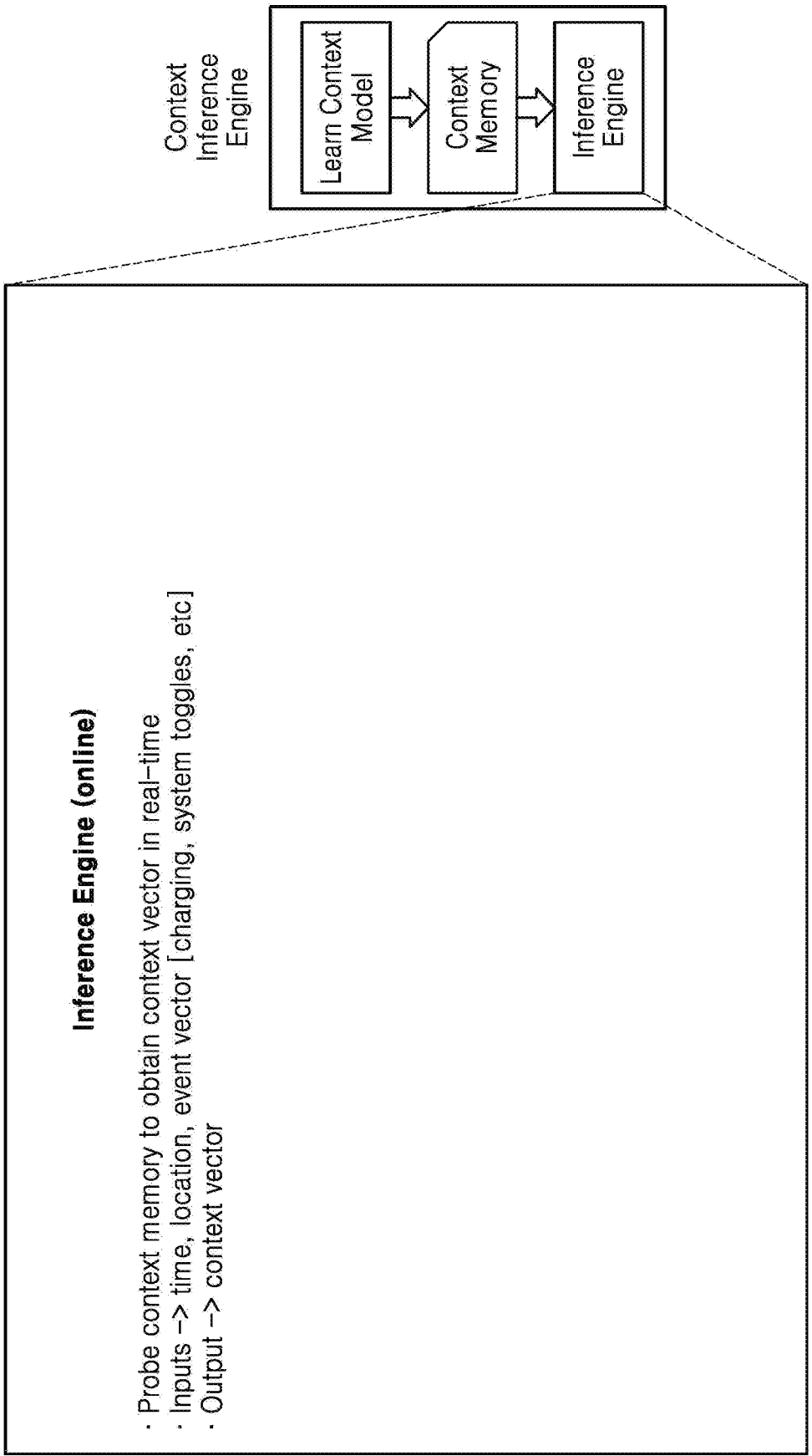

In more detail, the context inference engine learns the model context (offline) (FIG. 6B), stores the context model in memory (offline) (FIG. 6C) and provides the inference engine (online) (FIG. 6D).

Figure 6F:
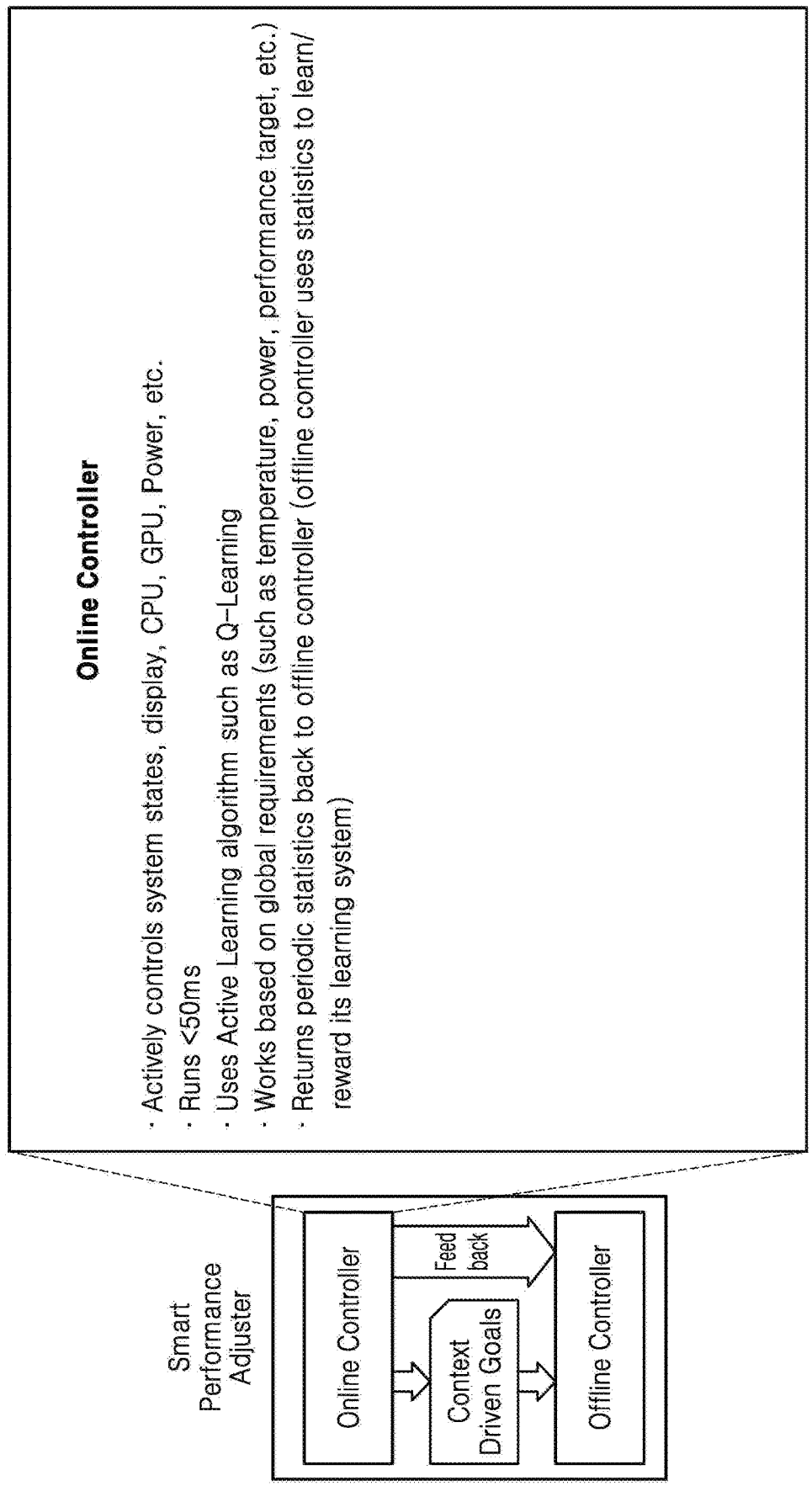

Learn Model Context (Offline)
1. Run Offline in Background;
2. Store model in memory;
State (s)=Current Time (t), Location (l), Event (e)
Model (m) encapsulates states (s1, s2, ... sN) to capture user behaviour via a Markov-chain or LSTM or other recurrent neural networks
Such a model will provide for any given Location (l) or Time (t)
Probability of event (Pe)
Pe=fn(l, t)
This probability Pe for several system events [charging, system toggle states, opening apps, etc.] make a vector which is the context input to Smart Performance Adjuster Context Memory (Offline)
Store context model in memory, either in form of neural network or look-up table
Process context memory to remove outliers or impossible actions to improve reliability
Combine similar states to reduce dimensionality of context vector Inference Engine (Online)
Probe context memory to obtain context vector in real-time
Inputs→time, location, event vector [charging, system toggles, etc]
Output→context vector In this example, SPA includes an offline controller (FIG. 6E) and an online controller (FIG. 6F).

The Offline Controller:
Uses context vector to decide high level goals for online controller
Runs in the order of minutes.
Changes goals if context changes.
Example: Goto power save mode if user leaves a charging location. And, Goto performance mode if user is now charging phone.
Uses Active Learning algorithm such as Q-Learning or RL to learn from feedback and statistics received online controller The online controller:
Actively controls system states, display, CPU, GPU, Power, etc.
Runs <50 ms Uses Active Learning algorithm such as Q-Learning
Works based on global requirements (such as temperature, power, performance target, etc.)
Returns periodic statistics back to offline controller (offline controller uses statistics to learn/reward its learning system)

Figure 7A:
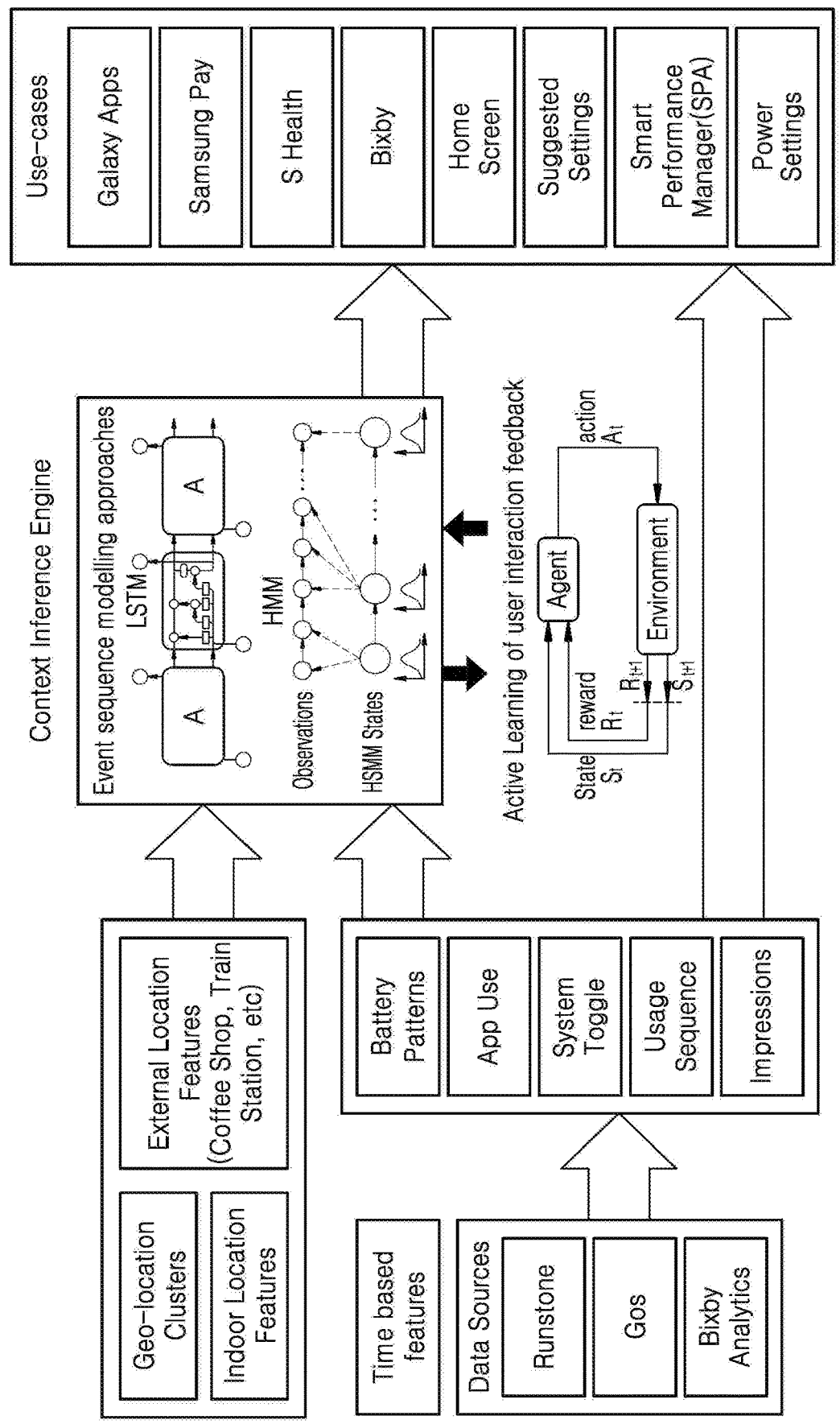
FIG. 7A schematically depicts a mobile device according to an exemplary embodiment, in use.
Figure 7B:
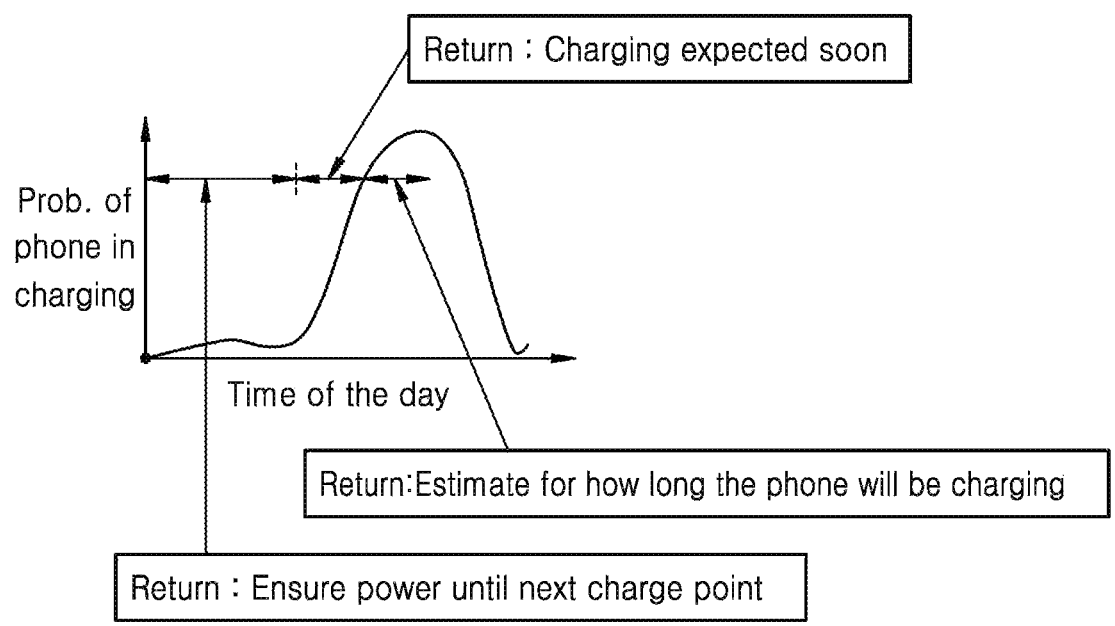
FIGS. 7B, 7C, and 7D schematically depict the mobile device, in use, in more detail.
Figure 7C:
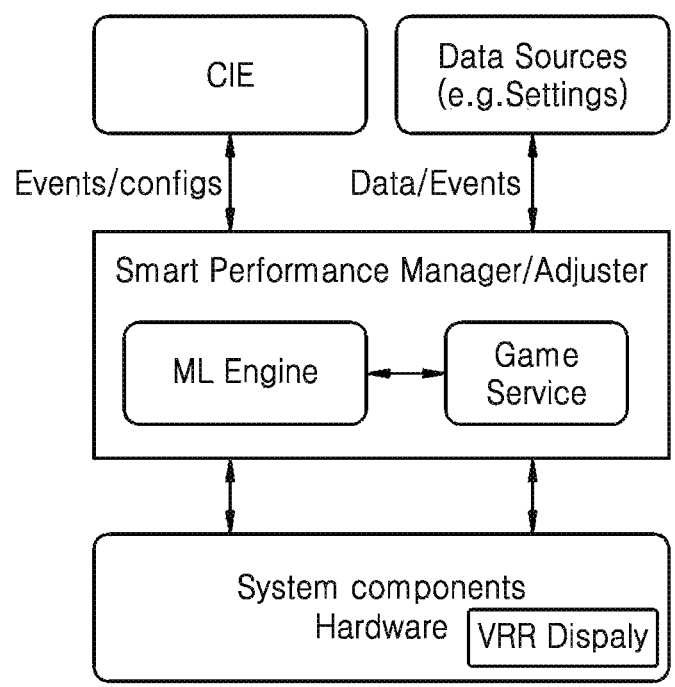
Figure 7D:
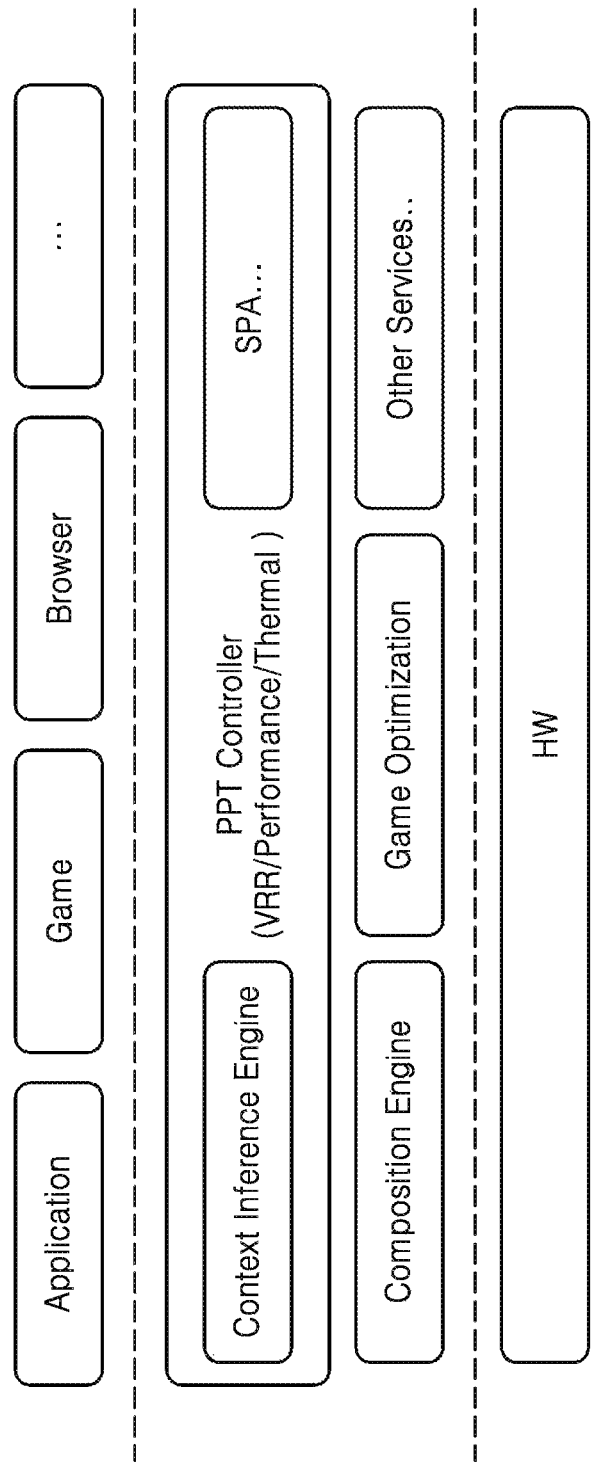

FIG. 7A schematically depicts a mobile device (100) according to an exemplary embodiment, in use; and FIG. 7B to 7D schematically depict the mobile device, in use, in more detail.

The context inference engine understands device usage patterns and probabilistically predicts charger availability, personalized performance metrics, settings etc.

The Context Inference Engine Analyses:
Battery usage/charging patterns
App usage patterns (e.g. duration of app/game usage, type of apps etc.)
User system settings (e.g. power saving, volume levels, brightness etc.) for given app/game
Other manual user tunings (e.g. closing all apps before playing games etc.)

The Context Inference Engine Predicts:
Context Vector: Probability of a given events (e.g. charger availability) for a given time location and other system states The SPA Queries the CIE for:
Probabilities of events
Usage patterns The SPA automatically configures system by, for example:
Closing apps before starting a game
Tuning system settings like brightness, volume levels etc.
Sets refresh rate of display (e.g. VRR display) for given game/app considering
Probability of charging next time
User preference of high performance vs longer usage
Without impacting overall experience of the device usage
Scenario A: Tuning settings of device intelligently without user interventions The CIE learns devices setting pattern of user such as before starting a specific application/game, closing other applications/games, choosing specific brightness levels, audio levels, power saving modes etc.

The SPA predicts and applies learned settings automatically when the users uses the specific application/game.

Scenario B: Tuning Performance Based on the Application Usage Behaviour

The CIE learns user application/game usage pattern such as duration, how often, type of app/game played.

The SPA sets performance parameters based on the learned usage pattern.

For example, if the user plays games for relatively short durations, for example 5 minutes each session, then the SPA sets highest possible performance parameters (no thermal throttling etc.).

For example, if the user plays games for relatively longer durations, for example say 45 minutes each session, then the SPA manages stable performance with thermal consideration by utilising frame rate setting on displays (VRR).

For example, if the user plays games or uses applications which drain the battery relatively quickly, without too much content changes on the display, then the SPA reduces the VRR to extend battery life.

Scenario C: Tuning Performance Based on the User Charging Patterns

The CIE learns user charging patterns.

The SPA set performances parameters based on the learned charging patterns.

For example, if the user plays games or uses applications which are relatively less power consuming, then the SPA manages stable performance with thermal consideration by utilising frame rate setting on displays (VRR) and gradually reduces the refresh rate of the display considering battery drainage rate and next potential user charging time.

For example, if the user plays games or uses applications which are relatively more power consuming, the SPA gradually reduces the refresh rate of the display considering battery drainage rate and next potential user charging time.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

In an embodiment, a method for providing personalized management system may be provided. The method may include obtaining training data comprising respective sets of parameters of the mobile device, including at least one of a frame rate of the display and a refresh rate of the display, and corresponding usage of the mobile device. The method may include training the ML algorithm using the provided training data comprising determining relationships between the respective sets of parameters of the mobile device (100) and the corresponding usage of the mobile device. The method may include controlling the mobile device (100) by managing parameters of the mobile device, including at least one of a frame rate of the display and a refresh rate of the display, responsive to the corresponding usage of the mobile device.

In an embodiment, the parameters of the mobile device (100) may include at least one of a temperature of the mobile device, a power consumption of the mobile device, a charge level of the rechargeable battery, a resolution of the display, a brightness of the display, a central processing unit, CPU, utilization of the mobile device, a graphics processing unit, GPU, utilization of the mobile device, a neural processing unit, NPU, utilization of the mobile device, an application-specific integrated circuit, ASIC, utilization of the mobile device (100) and a memory utilization of the mobile device.

In an embodiment, the usage of the mobile device (100) may include at least one of a current time, a location of the mobile device, a charging state of the rechargeable battery, a network state of the mobile device, a power saving mode of the mobile device (100) and an application running on the mobile device.

In an embodiment, determining relationships between the respective sets of parameters of the mobile device (100) and the corresponding usage of the mobile device (100) may include detecting actions relating to usage of the mobile device (100) by a user and recognizing patterns of the detected actions.

In an embodiment, managing the parameters of the mobile device (100) responsive to the corresponding usage of the mobile device (100) may include predicting an action relating to usage of the mobile device (100) by a user and managing the parameters of the mobile device (100) responsive to the predicted action.

In an embodiment, the action may be at least one of changing a location of the mobile device, changing a charging state of the rechargeable battery, changing a network state of the mobile device (100) and changing an application running on the mobile device.

In an embodiment, managing the parameters of the mobile device (100) responsive to the corresponding usage of the mobile device (100) may include maintaining a parameter of the mobile device (100) outside a default range thereof.

In an embodiment, maintaining the parameter of the mobile device (100) outside the default range thereof may be responsive to an action by a user of the mobile device.

In an embodiment, managing the parameters of the mobile device (100) responsive to the corresponding usage of the mobile device (100) may include restoring a parameter of the mobile device (100) inside a default range thereof.

In an embodiment, controlling the mobile device (100) may be performed by at least one of hardware controllers, including a power/dynamic voltage and frequency scaling, DVFS, controller, a scheduler and a display controller, and a device controller (110). And the device controller (110) may be configured to coordinate control of the set of hardware controllers according to the managed parameters.

In an embodiment, controlling the mobile device (100) may be performed by an offline controller or an online controller.

In an embodiment, a mobile device (100) for providing personalized management system may be provided. The mobile device (100) may include a display, a rechargeable battery, a memory storing one or more instructions and at least one processor configured to execute the one or more instruction. The at least one processor may be configured to obtain training data comprising respective sets of parameters of the mobile device, including at least one of a frame rate of the display and a refresh rate of the display, and corresponding usage of the mobile device. The at least one processor may be configured to train the ML algorithm using the provided training data comprising determining relationships between the respective sets of parameters of the mobile device (100) and the corresponding usage of the mobile device. The at least one processor may be configured to control the mobile device (100) by managing parameters of the mobile device, including at least one of a frame rate of the display and a refresh rate of the display, responsive to the corresponding usage of the mobile device.

In an embodiment, a computer-readable recording medium having recorded thereon a program for executing the method on a computer may be provided. The method may include obtaining training data comprising respective sets of parameters of the mobile device, including at least one of a frame rate of the display and a refresh rate of the display, and corresponding usage of the mobile device. The method may include training the ML algorithm using the provided training data comprising determining relationships between the respective sets of parameters of the mobile device (100) and the corresponding usage of the mobile device. The method may include controlling the mobile device (100) by managing parameters of the mobile device, including at least one of a frame rate of the display and a refresh rate of the display, responsive to the corresponding usage of the mobile device.

According to an embodiment of the disclosure, a machine-readable storage medium or recording medium may be provided in a form of a non-transitory storage medium. Here, the 'non-transitory storage medium' only denotes a tangible device and does not contain a signal (for example, electromagnetic waves). This term does not distinguish a case where data is stored in the storage medium semi-permanently and a case where the data is stored in the storage medium temporarily. For example, the 'non-transitory storage medium' may include a buffer where data is temporarily stored.

According to an embodiment of the disclosure, a method according to various embodiments of the disclosure disclosed in the present specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as an electronic device of a manufacturer, an electronic device of an application store, or a memory of a relay electronic device.

What is claimed is:

1. A method for providing personalized management system for a mobile device, the method comprising:
    obtaining usage data for a user as the user uses the mobile device, the usage data comprising use context of the mobile device including at least one of a time, a location, a charging status, a network status, a power saving, and application status, and a sets of parameters for the use context of the mobile device including at least one of a frame rate of a display of the mobile device or a refresh rate of the display;
    providing the usage data for the user as training data to a machine learning (ML) algorithm pre-trained with mobile device usage data obtained from a population of users, the ML algorithm being configured to determine relationships between use contexts and corresponding sets of parameters for the use contexts;
    obtaining a current set of parameters for a current use context of the mobile device by inputting current usage data to the ML algorithm; and
    controlling the mobile device based on the current set of parameters for the current use context of the mobile device.

2. The method of claim 1, wherein the parameters of the mobile device include at least one of a temperature of the mobile device, power consumption of the mobile device, a charge level of a rechargeable battery, a resolution of the display, a brightness of the display, central processing unit (CPU) utilization of the mobile device, graphics processing unit (GPU) utilization of the mobile device, a neural processing unit (NPU) utilization of the mobile device, application-specific integrated circuit (ASIC) utilization of the mobile device, or memory utilization of the mobile device.

3. The method of claim 1, wherein the use context of the mobile device includes at least one of a current time, a location of the mobile device, a charging state of a rechargeable battery, a network state of the mobile device, a power saving mode of the mobile device, or an application running on the mobile device.

4. The method of claim 1, wherein relationships between the use contexts and the corresponding sets of parameters of the mobile device are based on actions relating to usage of the mobile device by a user and patterns of user actions.

5. The method of claim 1, wherein the obtaining of the current set of parameters for the current use context of the mobile device comprises predicting an action relating to usage of the mobile device by the user and obtaining the current set of parameters for the current use context of the mobile device corresponding to the predicted action.

6. The method of claim 5, wherein the action is at least one of changing a location of the mobile device, changing a charging state of a rechargeable battery, changing a network state of the mobile device, or changing an application running on the mobile device.

7. The method of claim 1, wherein the controlling of the mobile device comprises maintaining at least one parameter of the mobile device to be outside a default range thereof.

8. The method of claim 7, wherein maintaining the at least one parameter of the mobile device to be outside the default range thereof is responsive to an action by the user.

9. The method of claim 1, wherein the controlling of the mobile device comprises restoring at least one parameter of the mobile device to be inside a default range thereof.

10. The method of claim 1, wherein the current set of the parameters are managed by at least one of hardware controllers, including a power/dynamic voltage and frequency scaling, DVFS, controller, a scheduler and a display controller, or a device controller,
    wherein the device controller is configured to coordinate control of the set of hardware controllers according to the current set of parameters.

11. The method of claim 1, wherein the current set of the parameters are managed by an offline controller or an online controller.

12. A mobile device for providing personalized management system, the mobile device comprising:
    a display;
    a rechargeable battery;
    memory storing one or more instructions; and
    at least one processor, comprising processing circuitry, configured to execute the one or more instructions and to control the mobile device to:
        obtain usage data for a user as the user uses the mobile device, the usage data comprising use contexts of the mobile device including at least one of a time, a location, a charging status, a network status, a power saving, and application status, and a set of parameters for the use contexts of the mobile device, including at least one of a frame rate of the display or a refresh rate of the display;

provide the usage data for the user as training data to a machine learning (ML) algorithm pre-trained with mobile device usage data obtained from a population of users, the ML algorithm being configured to determine relationships between use contexts and the corresponding sets of parameters for the use contexts;

obtain a current set of parameters for a current use context of the mobile device by inputting current usage data to the ML algorithm; and control the mobile device based on the current set of parameters of the mobile device.

13. The mobile device of claim 12, wherein the parameters of the mobile device include at least one of a temperature of the mobile device, power consumption of the mobile device, a charge level of the rechargeable battery, a resolution of the display, a brightness of the display, central processing unit (CPU) utilization of the mobile device, graphics processing unit GPU utilization of the mobile device, neural processing unit (NPU) utilization of the mobile device, application-specific integrated circuit (ASIC) utilization of the mobile device, or memory utilization of the mobile device.

14. The mobile device of claim 12, wherein the use contexts of the mobile device includes at least one of a current time, a location of the mobile device, a charging state of the rechargeable battery, a network state of the mobile device, a power saving mode of the mobile device, or an application running on the mobile device.

15. The mobile device of claim 12, wherein relationships between the use contexts and the corresponding sets of parameters of the mobile device are based on actions relating to usage of the mobile device by a user and patterns of user actions.

16. The mobile device of claim 12, wherein the obtaining of the current set of parameters for the current use context of the mobile device comprises predicting an action relating to usage of the mobile device by the user and obtaining the current set of parameters for the current use context of the mobile device corresponding to the predicted action.

17. The mobile device of claim 16, wherein the action is at least one of changing a location of the mobile device, changing a charging state of the rechargeable battery, changing a network state of the mobile device, or changing an application running on the mobile device.

18. The mobile device of claim 12, wherein the controlling of the mobile device comprises maintaining at least one parameter of the mobile device to be outside a default range thereof.

19. The mobile device of claim 18, wherein maintaining the at least one parameter of the mobile device to be outside the default range thereof is responsive to an action by the user.

20. A non-transitory computer-readable recording medium having recorded thereon a program which, when executed by at least one processor of a mobile device, controls the mobile device to perform operations comprising:

obtaining usage data for a user as the user uses the mobile device, the usage data comprising use context of the mobile device including at least one of a time, a location, a charging status, a network status, a power saving, and application status, and a set of parameters for the use context of the mobile device including at least one of a frame rate of a display of the mobile device or a refresh rate of the display;

providing the usage data for the user as training data to a machine learning (ML) algorithm pre-trained with mobile device usage data obtained from a population of users, the ML algorithm being configured to determine relationships between use contexts and corresponding sets of parameters for the use contexts;

obtaining a current set of parameters for a current use context of the mobile device by inputting current usage data to the ML algorithm; and controlling the mobile device based on the current set of parameters for the current use context of the mobile device.

\* \* \* \* \*